(12) United States Patent
Anzai et al.

(10) Patent No.: US 10,986,093 B2
(45) Date of Patent: Apr. 20, 2021

(54) MONITORING DEVICE, MONITORING METHOD, AND COMPUTER PROGRAM

(71) Applicant: Panasonic Intellectual Property Management Co., Ltd., Osaka (JP)

(72) Inventors: Jun Anzai, Kanagawa (JP); Tomoyuki Haga, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 16 days.

(21) Appl. No.: 16/505,628

(22) Filed: Jul. 8, 2019

(65) Prior Publication Data

US 2019/0334897 A1    Oct. 31, 2019

Related U.S. Application Data

(63) Continuation of application No. PCT/JP2017/040173, filed on Nov. 8, 2017.

(30) Foreign Application Priority Data

Jan. 18, 2017  (JP) .............................. JP2017-007043
Mar. 22, 2017  (JP) .............................. JP2017-056570

(51) Int. Cl.
    *H04L 29/06* (2006.01)
    *H04L 12/40* (2006.01)

(52) U.S. Cl.
    CPC .......... *H04L 63/0876* (2013.01); *H04L 12/40* (2013.01); *H04L 2012/40215* (2013.01); *H04L 2012/40273* (2013.01)

(58) Field of Classification Search
    CPC ................. H04L 63/0876; H04L 12/40; H04L 2012/40215; H04L 2012/40273
    See application file for complete search history.

(56) References Cited

U.S. PATENT DOCUMENTS

2014/0245441 A1* 8/2014 Lee .................. H04L 63/1433
                                                      726/23
2014/0310530 A1  10/2014 Oguma et al.
(Continued)

FOREIGN PATENT DOCUMENTS

JP    2013-131907 A    7/2013
JP    2014-078911      5/2014
(Continued)

OTHER PUBLICATIONS

International Search Report of PCT application No. PCT/JP2017/040173 dated Jan. 30, 2018.
(Continued)

*Primary Examiner* — Alexander Lagor
*Assistant Examiner* — William B Jones
(74) *Attorney, Agent, or Firm* — Greenblum & Bernstein, P.L.C.

(57) ABSTRACT

The monitoring device includes a receiver and a processor. The receiver receives a frame from a communication network. The processor performs a first determination that determines whether the frame is illegal based on a result of message authentication for the frame and a second determination that determines whether the frame is illegal based on a state of the frame and a predetermined rule. In addition, the processor executes, in accordance with a combination of a result of the first determination and a result of the second determination, at least one of processing for the frame, processing for a transmission source device of the frame, change of contents to be notified to an external device, and change of priority of notification to the external device.

19 Claims, 11 Drawing Sheets

(56) References Cited

U.S. PATENT DOCUMENTS

| | | |
|---|---|---|
| 2015/0066239 A1 | 3/2015 | Mabuchi |
| 2015/0124597 A1 | 5/2015 | Mabuchi et al. |
| 2015/0358351 A1 | 12/2015 | Otsuka et al. |
| 2016/0099939 A1* | 4/2016 | Jung ................... H04L 63/0876 713/170 |
| 2016/0205194 A1 | 7/2016 | Kishikawa et al. |
| 2016/0366229 A1* | 12/2016 | Yamaura ................. H04L 67/42 |
| 2017/0207922 A1 | 7/2017 | Ando et al. |
| 2018/0367546 A1* | 12/2018 | Miyashita ............. H04L 63/126 |

FOREIGN PATENT DOCUMENTS

| | | |
|---|---|---|
| JP | 2014-146868 | 8/2014 |
| JP | 2014-183395 | 9/2014 |
| WO | 2013/065689 | 5/2013 |
| WO | 2013/171829 A1 | 11/2013 |
| WO | 2015/170451 | 11/2015 |

OTHER PUBLICATIONS

T. Matsumoto, M. Hata, M. Tanabe, K. Yoshioka and K. Oishi, "A Method of Preventing Unauthorized Data Transmission in Controller Area Network", 2012 IEEE 75th Vehicular Technology Conference, 2012.

Japanese Office Action dated Aug. 11, 2020 for Japanese Patent Application No. 2017-007043.

* cited by examiner

FIG. 4

| | MAC verification | Behavior verification | Additional condition | Conceivable threats | Command countermeasures | ECU countermeasures |
|---|---|---|---|---|---|---|
| Pattern 1 | OK | NG | None | ECUs having MAC keys are completely taken over (MAC key available) | CGW: filtered or invalidated<br>ECU: filtered<br>CMI: invalidated | Target ECU is identified and following one or more items are performed<br>(1) Perform command countermeasures described left also on other frames (commands) transmitted from target ECU<br>(2) Perform command countermeasures described left also on all frames (commands) flowing in bus connected with target ECU<br>(3) Update program of target ECU<br>(4) Update MAC keys of all ecus excluding target ECU (revocation) |
| Pattern 2 | NG | NG | None | ECUs having MAC keys are partially taken over (MAC key unavailable) | CGW: invalidated<br>ECU: none<br>CMI: invalidated | |
| Pattern 3 | n/a | NG | None | ECUs having no MAC keys are taken over | CGW: filtered or invalidated<br>ECU: none<br>CMI: invalidated | |
| Pattern 4 | n/a | NG | Receive from external bus | Illegal frame without MAC is injected from outside (including illegal ECU connection) | CGW: filtered or invalidated<br>ECU: none<br>CMI: invalidated | None |
| Pattern 5 | OK | NG | Receive from external bus | Illegal frame with MAC is injected from outside (MAC key leakage) | CGW: filtered or invalidated<br>ECU: filtered<br>CMI: invalidated | Update MAC keys of all ECUs |
| Pattern 6 | NG | OK | None | Behavior verification rule is incomplete | Log data including target command is stored. Log data is provided offline to rule generation device. | |

FIG. 10

| | MAC verification | Behavior verification | Conceivable threats | Priority | Notification contents | Additional information |
|---|---|---|---|---|---|---|
| Pattern 1 | OK | NG | ECUs having MAC keys are completely taken over (MAC key available) | High | There is possibility of MAC leakage or target ECU takeover | (A) Result of MAC verification and behavior verification<br>(B) Illegal command information (command ID)<br>(C) ID of ECU having possibility of being taken over, other command information transmitted by the ECU |
| Pattern 2 | NG | NG | ECUs having MAC keys are partially taken over (MAC key unavailable) | Low | There is possibility of target ECU takeover | Above (A) and (B) |
| Pattern 3 | n/a | NG | ECUs having no MAC keys are taken over | Low | There is possibility of target ECU takeover or external injection of illegal command | Above (A)(B) and (C) |
| Pattern 4 | n/a | NG | Illegal frame without MAC is injected from outside (including illegal ECU connection) | Low | There is possibility of target ECU takeover or external injection of illegal command | Above (A) and (B) |
| Pattern 5 | OK | NG | Illegal frame with MAC is injected from outside (MAC key leakage) | High | There is possibility of MAC leakage or target ECU takeover | Above (A) and (B) |
| Pattern 6 | NG | OK | Behavior verification rule is incomplete | Middle | There is possibility that behavior verification rule is incomplete | Above (A) and (B)<br>(D) Command before and after illegal command<br>(E) Command related to illegal command |
| Pattern 7 | OK | OK | Complete case | — | No security abnormality | |

MONITORING DEVICE, MONITORING METHOD, AND COMPUTER PROGRAM

CROSS-REFERENCE TO RELATED APPLICATIONS

This application is a U.S. national stage application of the PCT International Application No. PCT/JP2017/040173 filed on Nov. 8, 2017, which claims the benefit of foreign priority of Japanese patent application No. 2017-007043 filed on Jan. 18, 2017 and Japanese patent application No. 2017-056570 filed on Mar. 22, 2017, the contents all of which are incorporated herein by reference.

BACKGROUND

1. Technical Field

The present invention relates to a data processing technique, especially relates to a monitoring device, a monitoring method, and a computer program.

2. Description of the Related Art

In recent years, an automobile is mounted with a lot of electronic control units (hereinafter, called "ECUs"). A network that connects these ECUs is called an in-vehicle network. Many standards are present for an in-vehicle network, and among them a controller area network (CAN) is widely used.

Due to motorization of an automobile, an actuator such as a steering can be controlled via an in-vehicle network. Meanwhile, in order to prevent illegal manipulation of the actuator or the like due to transmission of an illegal command in the in-vehicle network, message authentication using a message authentication code (hereinafter, called "MAC") is sometimes executed (for example, see International Publication No. 2013/065689).

SUMMARY

The invention of the present application improves security of a communication system.

The monitoring device according to one aspect of the present invention includes a receiver and a processor. The receiver receives a frame from a communication network. The processor performs a first determination that determines whether the frame is illegal based on a result of message authentication for the frame and a second determination that determines whether the frame is illegal based on a state of the frame and a predetermined rule. In addition, the processor executes, in accordance with a combination of a result of the first determination and a result of the second determination, at least one of processing for a frame, processing for a transmission source device of a frame, change of contents to be notified to an external device, and change of priority of notification to an external device.

Another aspect of the present invention is a monitoring method executed by a computer. The monitoring method includes receiving a frame from the communication network. In addition, the monitoring method includes performing a first determination that determines whether the frame is illegal based on a result of message authentication for the frame and a second determination that determines whether the frame is illegal based on a state of the frame and a predetermined rule. Further, the monitoring method includes executing, in accordance with a combination of a result of the first determination and a result of the second determination, at least one of processing for a frame, processing for a transmission source device of a frame, change of contents to be notified to an external device, and change of priority of notification to an external device.

Note that, arbitrary combinations of above constituent elements and any conversions of aspects of the present invention made among a computer program, a recording medium recording the computer program, a vehicle mounted with the present device and the like are also effective as aspects of the present invention.

According to the present invention, it is possible to improve security of a communication system.

BRIEF DESCRIPTION OF DRAWINGS

FIG. 4 is a diagram illustrating an illegality countermeasure for each illegality detection pattern.

FIG. 10 is a diagram illustrating illegality detection patterns.

DETAILED DESCRIPTION OF PREFERRED EMBODIMENTS

Prior to description of first exemplary embodiment, problems found in a conventional technology will briefly be described. When message authentication is executed, there are also a risk of leakage of a key of MAC and a risk of takeover of entire MAC-compatible ECU by an unauthorized person. Hence, further improvement of security is necessary in a communication system.

Prior to description of a detailed configuration of the first exemplary embodiment, its outline will be first described. In an in-vehicle network system of the exemplary embodiment, message authentication using MAC (hereinafter, also called "MAC verification") and behavior verification for a frame (in other words, a command) flowing in the in-vehicle network are used together. The behavior verification can be said as behavior detection technique and also as intrusion detection technique. For example, technique disclosed in Unexamined Japanese Patent Publication No 2014-146868 may be applied to the behavior verification. In the in-vehicle network system of the exemplary embodiment, an illegality countermeasure action (in other words, protection action) is executed by comprehensively determining both a result of MAC verification and a result of behavior verification.

First Exemplary Embodiment

Figure 1:
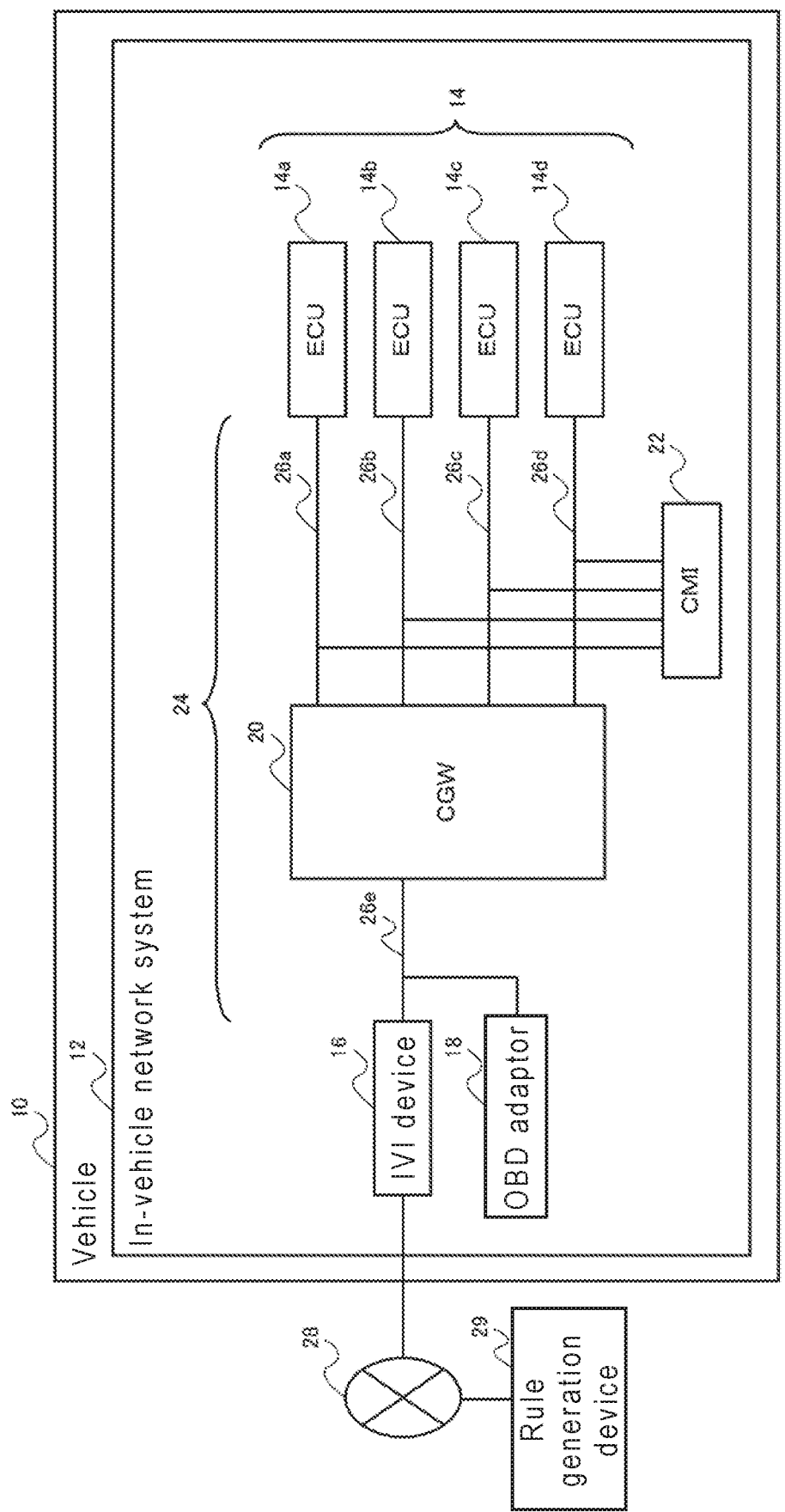
FIG. 1 is a diagram illustrating a configuration of an in-vehicle network system according to a first exemplary embodiment.

FIG. 1 is a diagram illustrating a configuration of an in-vehicle network system according to the first exemplary embodiment.

In-vehicle network system 12 of the exemplary embodiment is a communication system constructed on vehicle 10 and has a function as an illegality detection system in the in-vehicle network. In-vehicle network system 12 includes ECU 14a, ECU 14b, ECU 14c, and ECU 14d collectively called ECU 14, in-vehicle infotainment (IVI) device 16, on-board diagnostics (OBD) adaptor 18, central gate way (CGW) 20, and centralized monitoring and interceptor (CMI) 22. These devices are connected to each other via CAN 24.

Each of a plurality of ECUs 14 is connected to a sensor or an actuator (not illustrated), transmits a frame indicating contents detected by the sensor to CAN 24, or controls the actuator based on a command indicated by a frame received from CAN 24. ECU 14a connected to power train bus 26a among a plurality of buses of CAN 24 is, for example, an engine ECU. ECU 14b connected to driving assistance bus 26b is, for example, a steering ECU. ECU 14c connected to chassis bus 26c is, for example, a suspension ECU. ECU 14d connected to body bus 26d is, for example, a power window ECU.

IVI device 16 is information equipment that presents various pieces of information to an occupant and is a car navigation device, for example. IVI device 16 is connected to external communication network 28 that is a communication network (such as the Internet) outside vehicle 10. Vehicle 10 is connected to rule generation device 29 via external communication network 28. Rule generation device 29 is a server that generates a behavior rule to be described below. OBD adapter 18 is an adapter that outputs various pieces of information flowing in CAN 24, for example, information indicating an operation state of vehicle 10, to an external device. IVI device 16 and OBD adapter 18 are connected to external bus 26e among the plurality of buses of CAN 24. External bus 26e is a bus in which a frame transmitted from a device other than ECU 14 flows. Frames flowing in external bus 26e include, for example, a frame transmitted from a device on a side of external communication network 28, and a frame transmitted from a device connected to OBD adapter 18.

CGW 20 is a gateway ECU connected to a plurality of buses of CAN 24 and executing relay processing and routing processing of frames between buses. CMI 22 is an ECU connected to a plurality of buses of CAN 24 and monitoring frames flowing in each of the buses. As a modified example, CMI 22 may be configured not to be connected to CAN 24, in other words, in-vehicle network system 12 does not need to have CMI 22.

In the exemplary embodiment, a monitoring module is introduced into a plurality of devices complying with message authentication using MAC. Specifically, the monitoring module is introduced into CGW 20 and a part of ECUs 14. Each of CGW 20 and ECU 14 into which the monitoring module is introduced monitors an illegal frame (in other words, illegal command) flowing in CAN 24, and functions as a monitoring device executing an illegality countermeasure. As a modified example, (1) only CGW 20 may be configured to introduce the monitoring module, (2) only CMI 22 may be configured to introduce the monitoring module, and (3) only ECU 14 complying with message authentication using MAC may be configured to introduce the monitoring module.

Figure 2:
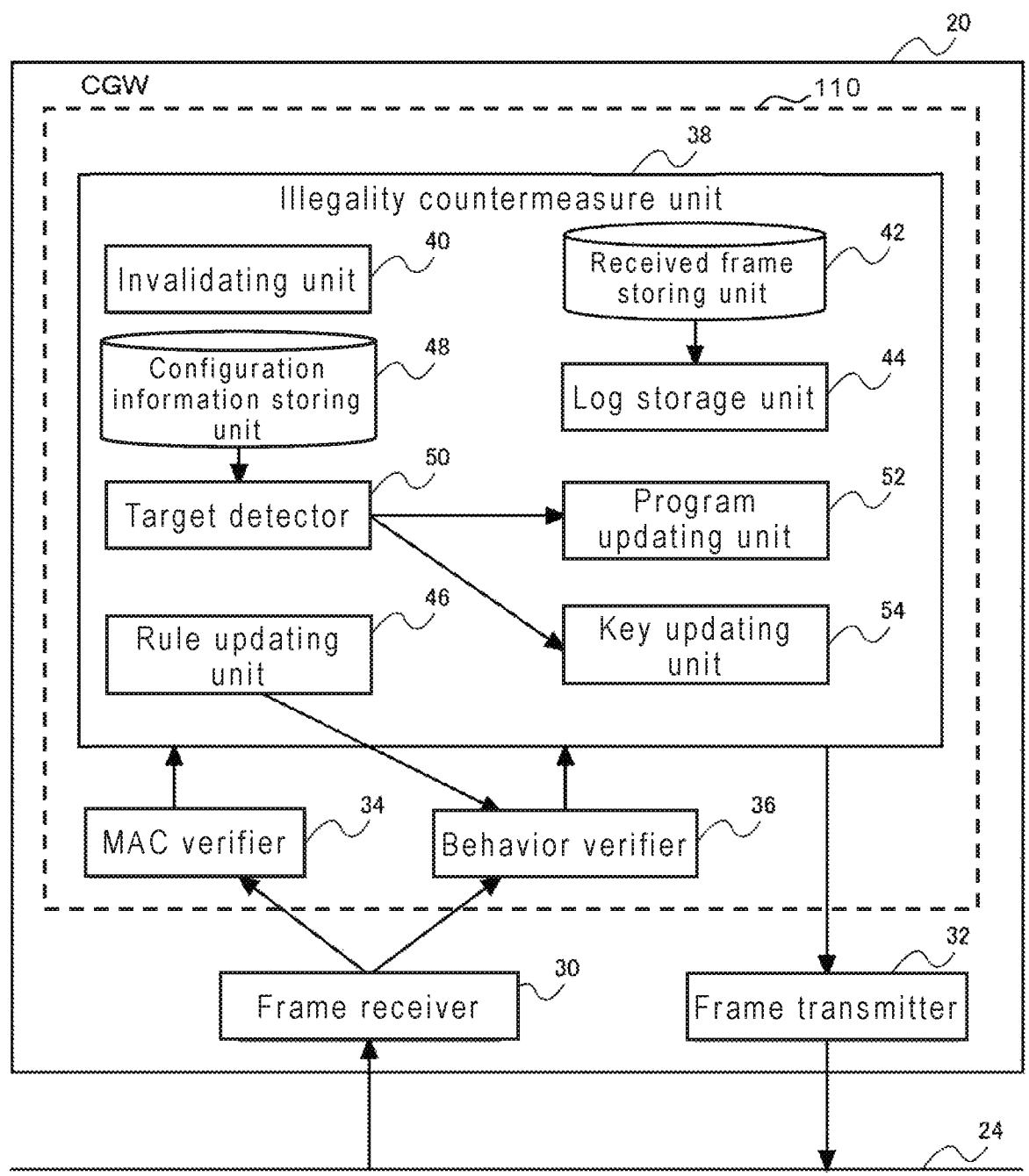
FIG. 2 is a block diagram illustrating a functional configuration of a central gate way (CGW) in FIG. 1.

FIG. 2 is a block diagram illustrating a functional configuration of CGW 20 in FIG. 1. CGW 20 includes frame receiver 30, frame transmitter 32, MAC verifier 34, behavior verifier 36, and illegality countermeasure unit 38. Note that, when CMI 22 in FIG. 1 has the monitoring module, the functional configuration of CMI 22 is similar to that in FIG. 2. In addition, one processor 110 may be configured as a monitoring module including MAC verifier 34, behavior verifier 36, and illegality countermeasure unit 38.

In the exemplary embodiment, each block illustrated in the block diagram can be realized by elements including a central processing unit (CPU) of a computer and a memory or a mechanical device in the manner of hardware, or can be realized by a computer program and the like in the manner of software, but here each block is drawn as a functional block realized by cooperation thereof. It will be understood by those skilled in the art that these functional blocks can be realized in various forms through combinations of hardware and software. For example, a computer program including a module corresponding to each block in FIG. 2 may be stored in a memory of CGW 20. The CPU of CGW 20 may achieve the function of each block by appropriately reading and executing the computer program.

Frame receiver 30 receives a frame from each bus of CAN 24. Frame receiver 30 inputs data of the received frame, together with identification information of the bus from which the frame has been received, to illegality countermeasure unit 38 via MAC verifier 34 and behavior verifier 36. Frame transmitter 32 transmits a frame to each bus of CAN 24. For example, frame transmitter 32 transfers a frame received from a certain bus to another bus excluding the certain bus.

MAC verifier 34 executes message authentication for a frame received by frame receiver 30 (hereinafter, also called a "target frame"). For example, MAC verifier 34 generates MAC based on a predetermined common key for message authentication (hereinafter, referred to as a "MAC key"). MAC verifier 34 compares the generated MAC with a MAC that a transmission source device (for example, ECU 14) has added to the target frame in advance. MAC verifier 34 determines that the message authentication succeeds when both MACs match with each other, and determines that the message authentication fails when both MACs do not match. MAC verifier 34 determines that the target frame does not includes anomaly and is legal when the message authentication succeeds, and determines that the target frame includes anomaly and is illegal when the message authentication fails.

Behavior verifier 36 determines, as behavior verification processing, whether the target frame is anomaly being corresponding to illegal or not, based on the state of the target frame and the predetermined behavior rule. Behavior verifier 36 holds a behavior rule provided from rule generation device 29 in a predetermined storage area. The behavior rule includes provisions related to a format of a frame (in other words, a message). The provisions related to a format specifically include provisions of fixed values in an identification (ID), a data length code (DLC), a payload, and the like. For example, the behavior rule may prescribe that a specified fixed value is set at a predetermined position of a frame.

In addition, the behavior rule includes provisions related to a behavior of a frame. The provisions related to a behavior specifically include provisions of variable values related to a cycle, a frequency, and a payload. For example, the behavior rule may include, for each of a plurality of IDs (also called frame IDs, and also called CAN-IDs), provisions of a range or a difference of a time interval from previous frame reception to present frame reception. In addition, the behavior rule may include, for each frame ID, limitation (allowable range or the like) of a difference from the previously received frame for a data item set at a predetermined position of the payload or a data item of a predetermined name in the payload.

Note that the behavior rule may include both of a black list and a white list. Behavior verifier 36 determines that a target frame is illegal when the target frame satisfies a rule as the black list. In addition, behavior verifier 36 determines that a target frame is illegal when the target frame deviates from a rule as the white list.

Illegality countermeasure unit 38 executes at least one of processing related to a target frame (also called "command countermeasure") and processing related to a transmission source device of a frame (also called "ECU countermeasure") according to a combination of an illegality determination result by MAC verifier 34 and an illegality determination result by behavior verifier 36. Note that, illegality countermeasure unit 38, when a target frame is determined to be legal by both the MAC verification and the behavior verification, delivers the target frame to frame transmitter 32 and causes frame transmitter 32 to transmit it to CAN 24.

Illegality countermeasure unit 38 includes invalidating unit 40, received frame storing unit 42, log storage unit 44, rule updating unit 46, configuration information storing unit 48, target detector 50, program updating unit 52, and key updating unit 54.

Invalidating unit 40 executes, as invalidating processing of a target frame, processing of deleting a target frame existing on a bus of CAN 24. Specifically, invalidating unit 40 generates an error frame for the target frame and causes frame transmitter 32 to output the error frame to CAN 24. This invalidates also target frames in other devices (ECU 14 and the like) on can 24. The technique disclosed in Non-Patent Literature (T. Matsumoto, M. Hata, M. Tanabe, K. Yoshioka, and K. Oishi, "A Method of Preventing Unauthorized Data Transmission in Controller Area Network," Vehicular Technology Conference, 2012.) may be applied to the invalidating processing of a frame. CGW 20 of the exemplary embodiment executes the invalidating processing for an illegal frame, but may execute discarding processing (in other words, filtering processing) for the illegal frame as with ECU 14 described below.

Received frame storing unit 42 stores and accumulates a plurality of frames received by frame receiver 30 in a predetermined storage area. Received frame storing unit 42 may sequentially delete, from the storage area, frames that have stayed for a predetermined time (30 minutes or the like) after being received. Received frame storing unit 42 may associate data of a frame with a determination result by MAC verifier 34 and a determination result by behavior verifier 36 for the frame and accumulate them.

Log storage unit 44, when a target frame is determined to be illegal by MAC verifier 34 and a target frame is determined to be legal by behavior verifier 36, stores at least log data related to the target frame. Then, the stored log data is collected offline (for example, during maintenance in a dealer) and the determination results are transmitted to rule generation device 29. Thereby, rule generation device 29 updates the behavior rule so that the target frame is determined to be illegal in the behavior verification. Specifically, log storage unit 44 stores, as log data, rule update instructing data including a past frame having the same ID as the target frame among the frames stored in received frame storing unit 42 and the target frame. For example, both the target frame and the past frame may specify a control command of a steering and specify a rotation angle of the steering.

The past frame may be different from the target frame in a combination of the determination result by MAC verifier 34 and the determination result by behavior verifier 36. Therefore, it is possible to support update of the behavior rule by rule generation device 29 by providing data including the past frame to rule generation device 29. In addition, log storage unit 44 may include, as log data, the determination result by MAC verifier 34 and the determination result by behavior verifier 36 for each of the past frame and the target frame in the rule update instructing data. Further, a frame having the same ID as the target frame among frames received after the target frame may be included in the rule update instructing data.

Rule generation device 29 delivers the generated or updated behavior rule to vehicle 10 via external communication network 28. Rule updating unit 46 obtains the behavior rule provided from rule generation device 29 via CAN 24. Then, rule updating unit 46 delivers the obtained behavior rule to behavior verifier 36 and updates the behavior rule held by behavior verifier 36.

Configuration information storing unit 48 stores attribute information on various constituent elements (here, called "configuration information") of CAN 24. The configuration information of the exemplary embodiment includes identification information of a bus to which each of a plurality of ECUs 14 is connected and an ID of a frame that each of a plurality of ECUs 14 transmits.

Target detector 50 detects an ECU serving as a target of the illegality countermeasure (hereinafter, called "target ECU") from among a plurality of ECUs 14 based on presence or absence of an illegality in a plurality of frames transmitted from a plurality of ECUs 14. Target detector 50 may detect a target ECU based on a ratio of illegality or a number of times of illegality of frames transmitted from each ECU 14. The target ECU may be called an illegal ECU and also called an ECU taken over by an unauthorized person.

Target detector 50 of the exemplary embodiment accumulates the number of times of illegality determination for each ID for frames determined to be illegal in at least one of the MAC verification and the behavior verification. Target detector 50 detects an ID the number of times of illegality determination for which becomes more than or equal to a predetermined threshold (for example, five times), and detects, as a target ECU, ECU 14 that transmits a frame having the ID with reference to configuration information storing unit 48.

Four types of configurations (1) to (4) for the ECU countermeasure will be described below (refer to FIG. 4). Actually, any one of the countermeasures may be executed, or a combination of two or more countermeasures may be executed.

(1) Invalidating unit 40 refers to the configuration information stored in configuration information storing unit 48 and executes processing of invalidating frames of all IDs that can be transmitted from the target ECU.

(2) Invalidating unit 40 refers to the configuration information stored in configuration information storing unit 48, identifies a bus of CAN 24 to which the target ECU is connected, and executes processing of invalidating all frames received by frame receiver 30 from the identified bus.

(3) Program updating unit 52 executes processing for updating a computer program (that is, reprogramming) stored in a read-only memory (ROM) of the target ECU. For example, CGW 20 may preliminarily hold a legitimate program for each ECU 14, and program updating unit 52 may overwrite and store a legitimate program for the target ECU in the ROM of the target ECU. In addition, program updating unit 52 may obtain a legitimate program for the target ECU from an external server via external communication network 28 and overwrite and store it in the ROM of the target ECU.

(4) Key updating unit 54 updates a MAC key that is a common key used across the plurality of ECUs 14. Key updating unit 54 delivers the updated MAC key to the plurality of ECUs 14. As described below, according to the combination of the result of MAC verification and the result of behavior verification, key updating unit 54 transmits the updated MAC key to all ECUs 14 and changes the MAC key used by all ECUs 14. Alternatively, key updating unit 54 transmits the updated MAC key to remaining ECUs 14 excluding the target ECU and changes the MAC key used by ECUs 14 other than the target ECU. Note that, key updating unit 54 may deliver, to each ECU, a MAC key encrypted by using a key different for each predetermined ECU (a key different from the MAC key).

In the exemplary embodiment, when a target frame is determined to be legal by MAC verifier 34 and the target frame is determined to be illegal by behavior verifier 36, and when the target frame is received from a bus (in the exemplary embodiment, external bus 26e) in which a frame transmitted from other than ECU 14 flows, key updating unit 54 updates the MAC key used by all ECUs 14. In a case of this determination, since the MAC verification succeeds, the MAC key may leak. In addition, the illegal frame is injected from outside. Hence, the MAC key used by all ECUs 14 is updated, thereby eliminating a leakage risk of the MAC key and improving security.

On the other hand, when an illegal frame is received from a bus (power train bus 26a or the like) other than external bus 26e, a situation is assumed in which the target ECU is taken over by an unauthorized person, and further the unauthorized person can use the MAC key. Hence, when an illegal frame is received from a bus other than external bus 26e, key updating unit 54 updates the MAC key used by ECUs 14 other than the target ECU.

Figure 3:
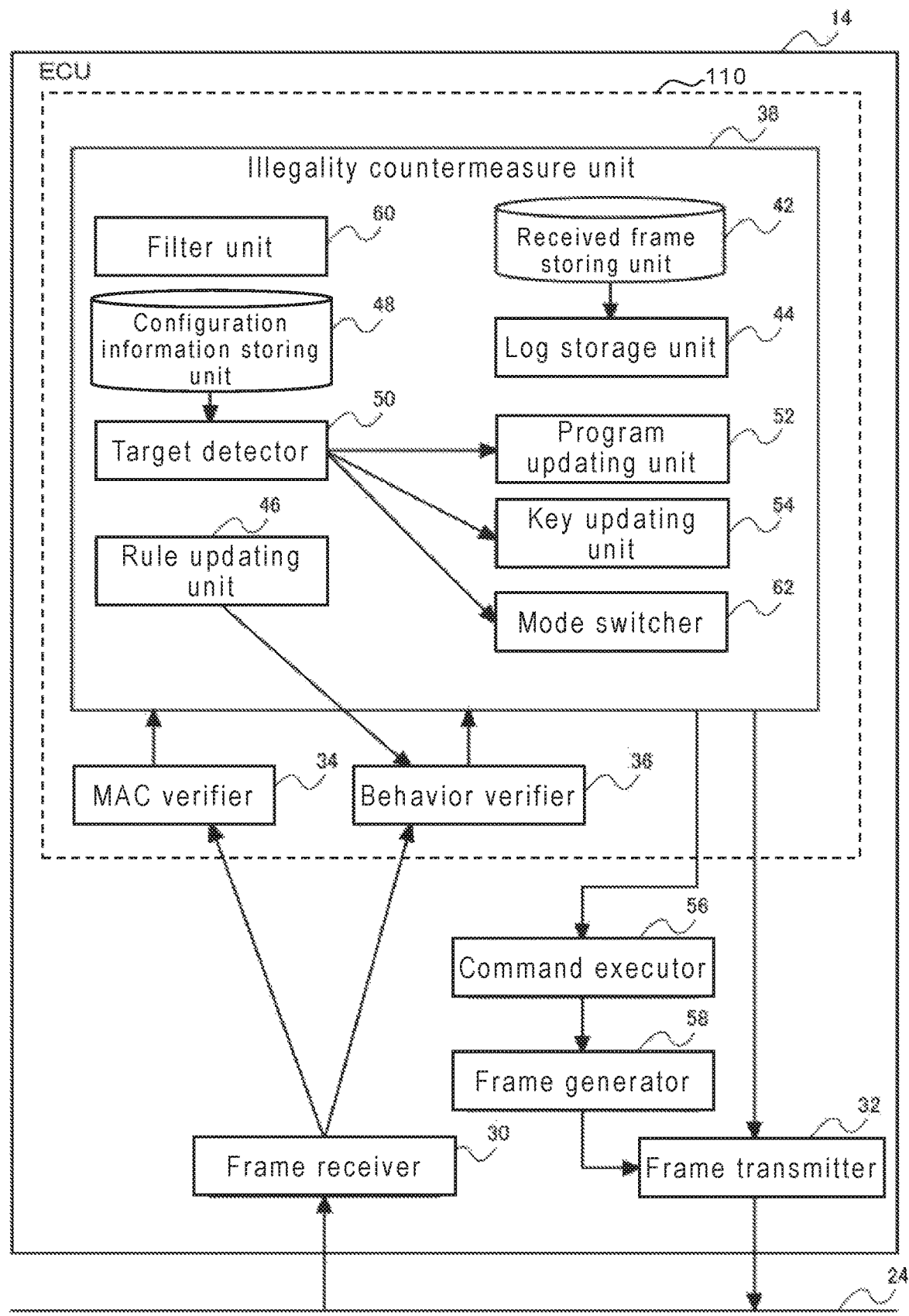
FIG. 3 is a block diagram illustrating a functional configuration of an ECU in FIG. 1.

FIG. 3 is a block diagram illustrating a functional configuration of ECU 14 in FIG. 1. FIG. 3 illustrates the functional configuration of ECU 14 complying with message authentication using MAC among a plurality of ECUs 14 in FIG. 1. In addition, in FIG. 3, the same code is attached to a functional block same as or corresponding to the functional block of CGW 20 described in FIG. 2. In the following, contents already described in relation to FIG. 2 are appropriately omitted.

ECU 14 includes frame receiver 30, frame transmitter 32, MAC verifier 34, behavior verifier 36, illegality countermeasure unit 38, command executor 56, and frame generator 58. Command executor 56 executes a command specified by a frame. For example, command executor 56 controls an actuator connected to the own ECU according to the command. Frame generator 58 generates a frame specifying a command to an external device (for example, another ECU 14), delivers the generated frame to frame transmitter 32, and causes frame transmitter 32 to transmit it.

Illegality countermeasure unit 38 of ECU 14 includes received frame storing unit 42, log storage unit 44, rule updating unit 46, configuration information storing unit 48, target detector 50, program updating unit 52, key updating unit 54, filter unit 60, and mode switcher 62. Filter unit 60 corresponds to invalidating unit 40 in CGW 20 and executes command countermeasure of ECU 14. Specifically, filter unit 60 discards a target frame determined to be illegal, in other words, discards a command specified by the target frame. For example, filter unit 60 may delete data of the target frame from a memory (not illustrated) inside ECU 14.

In addition, ECU 14 executes the already described ECU countermeasures. However, in ECU countermeasures (1) and (2) in CGW 20 of the exemplary embodiment, frame invalidating processing is executed, but in ECU countermeasures (1) and (2) in ECU 14, frame discarding processing, in other words, filter processing is executed. ECU countermeasures (3) and (4) are same as CGW 20.

Mode switcher 62, when a frame transmitted via CGW 20 is determined to be illegal in the behavior verification, determines that a security function of CGW 20 that is connected to a plurality of buses and is a core of the in-vehicle network is in a state of being broken through, and switches a mode of automatic driving of vehicle 10 to a fail-safe mode. For example, mode switcher 62 may refer to the configuration information stored in configuration information storing unit 48 and identify ECU 14 of a transmission source based on an ID of the target frame determined to be illegal. When ECU 14 of a transmission source is connected to a bus different from the bus to which the own ECU is connected, mode switcher 62 may determine that the target frame is relayed by CGW 20. In addition, the fail-safe mode may be a state in which automatic driving control (in other words, driving assistance processing by electric power) is turned off.

That the frame transmitted via CGW 20 is illegal means that CGW 20 is highly likely to be taken over by an unauthorized person. CGW 20 in CAN 24 is a basis of communication among a plurality of ECUs 14, and takeover of CGW 20 is a serious problem on security. Therefore, mode switcher 62 of the exemplary embodiment, when the frame transmitted via CGW 20 is illegal, shifts the automatic driving to a fail-safe mode to further enhance safety of vehicle driving. Note that, when a monitoring module is introduced into CMI 22, CMI 22 may have mode switcher 62.

As a modified example, not only when a frame transmitted via CGW 20 is illegal, but when a frame transmitted from a fundamental device of security of in-vehicle network system 12 is illegal, mode switcher 62 may switch a mode of automatic driving of vehicle 10 to a fail-safe mode. The fundamental device of security, for example, corresponds to a device (CGW 20, ECU 14, or the like) that holds a key for each ECU 14 and delivers a MAC key encrypted by the key for each ECU to each ECU 14. Mode switcher 62 may refer to the configuration information stored in configuration information storing unit 48 and determine whether the transmission source of the target frame is the fundamental device of security based on an ID of the target frame determined to be illegal.

FIG. 4 illustrates an illegality countermeasure for each illegality detection pattern. Here, a device into which a monitoring module can be introduced, that is, for example, ECU 14, CGW 20, or CMI 22 is collectively called a "monitoring device". In a command countermeasure column in FIG. 4, processing in cases where the monitoring device is ECU 14, CGW 20, and CMI 22 are illustrated, respectively.

When a target frame is determined to be legal in the MAC verification and the target frame is determined to be illegal in the behavior verification (pattern 1 and pattern 5), or when a target frame is determined to be illegal in the MAC verification and the target frame is determined to be illegal in the behavior verification (pattern 2), illegality countermeasure unit 38 of the monitoring device discards or invalidates the target frame, as the command countermeasure. Note that, in pattern 2, the command countermeasure in ECU 14 is "none" because in ECU 14 complying with message authentication, error processing is normally executed due to NG in the MAC verification. In addition, in pattern 2, the command countermeasure in CGW 20 is "invalidated" because it is effective as the countermeasure against denial of service attack (DoS attack).

In the case of pattern 1 and pattern 2, illegality countermeasure unit 38 executes one or more of four types of ECU countermeasures. In the case of pattern 5, illegality countermeasure unit 38 updates the MAC key of every ECU 14 as the ECU countermeasure.

When a target frame is determined to be illegal in the MAC verification and the target frame is determined to be legal in the behavior verification (pattern 6), illegality countermeasure unit 38 of the monitoring device stores, as log data, rule update instructing data including a target frame and preceding and following frames thereof, thereby causing rule generation device 29 to update the behavior rule based on the target frame and preceding and following frames thereof. For example, rule generation device 29, when the monitoring device has received the target frame again, updates the behavior rule so as to detect illegality in the behavior verification.

Each of patterns 3 and 4 in FIG. 4 is a pattern in which a frame transmitted from ECU 14 not complying with message authentication using MAC is illegal. That is, it is a pattern in which MAC verification cannot be executed because MAC is not added to the frame and illegality is detected in the behavior verification. Note that, pattern 3 is a pattern in which a target frame determined to be illegal is transmitted from ECU 14, and pattern 4 is a pattern in which a target frame determined to be illegal is injected from outside (in other words, received from external bus 26e).

In any of patterns 3 and 4, illegality countermeasure unit 38 of the monitoring device discards or invalidates the target frame, as the command countermeasure. Pattern 4 is a situation in which an illegal frame is injected from outside, the MAC key is not leaked, and thus the ECU countermeasure is not executed. In contrast, in pattern 3, the target frame is highly likely to be taken over, and thus illegality countermeasure unit 38 executes the same ECU countermeasure as in pattern 1 or the like.

Figure 5:
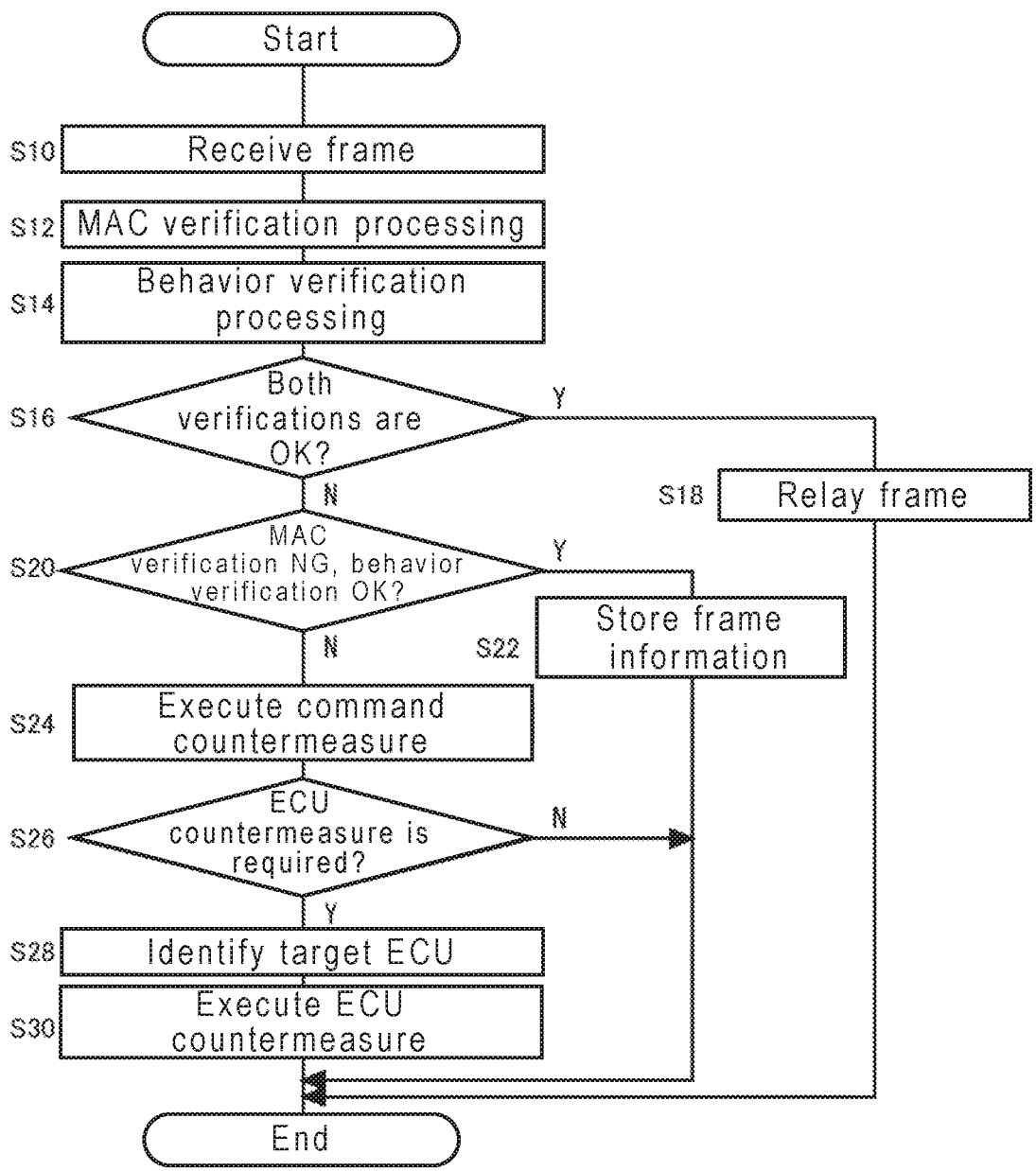
FIG. 5 is a flowchart illustrating an operation of the CGW in FIG. 1.

An operation of in-vehicle network system 12 having the above configuration will be described. FIG. 5 is a flowchart illustrating an operation of CGW 20 in FIG. 1. Frame receiver 30 receives a frame from CAN 24 (S10). MAC verifier 34 executes MAC verification for the received target frame and determines whether the target frame is legal or illegal (S12). Behavior verifier 36 executes behavior verification for the received target frame and determines whether the target frame is legal or illegal (S14). Note that, S12 and S14 have no limitation in execution order and may be executed in parallel.

When the target frame is determined to be legal in both the MAC verification and behavior verification (Y in S16), illegality countermeasure unit 38 delivers the target frame to frame transmitter 32, and frame transmitter 32 transfers the target frame according to a routing table in which a frame ID, a transfer source bus, and a transfer destination bus are associated with each other (S18). When a target frame is determined to be illegal in the MAC verification and the target frame is determined to be legal in the behavior verification (N in S16, Y in S20), illegality countermeasure unit 38 stores log data that is log data for causing rule generation device 29 to update the behavior rule and includes the target frame and preceding and following frames thereof (S22). When MAC verification result is illegal and behavior verification result is illegal, or when MAC verification result is legal and behavior verification result is illegal (N in S20), illegality countermeasure unit 38 executes a command countermeasure illustrated in FIG. 4 (S24).

When the ECU countermeasure is necessary according to the illegality detection pattern (FIG. 4) (Y in S26), illegality countermeasure unit 38 identifies a target ECU that is highly likely to be taken over (S28). Illegality countermeasure unit 38 executes the ECU countermeasure related to at least one of the target ECU and another ECU 14 (S30) When the ECU countermeasure is not necessary (N in S26), S28 and S30 are skipped.

Figure 6:
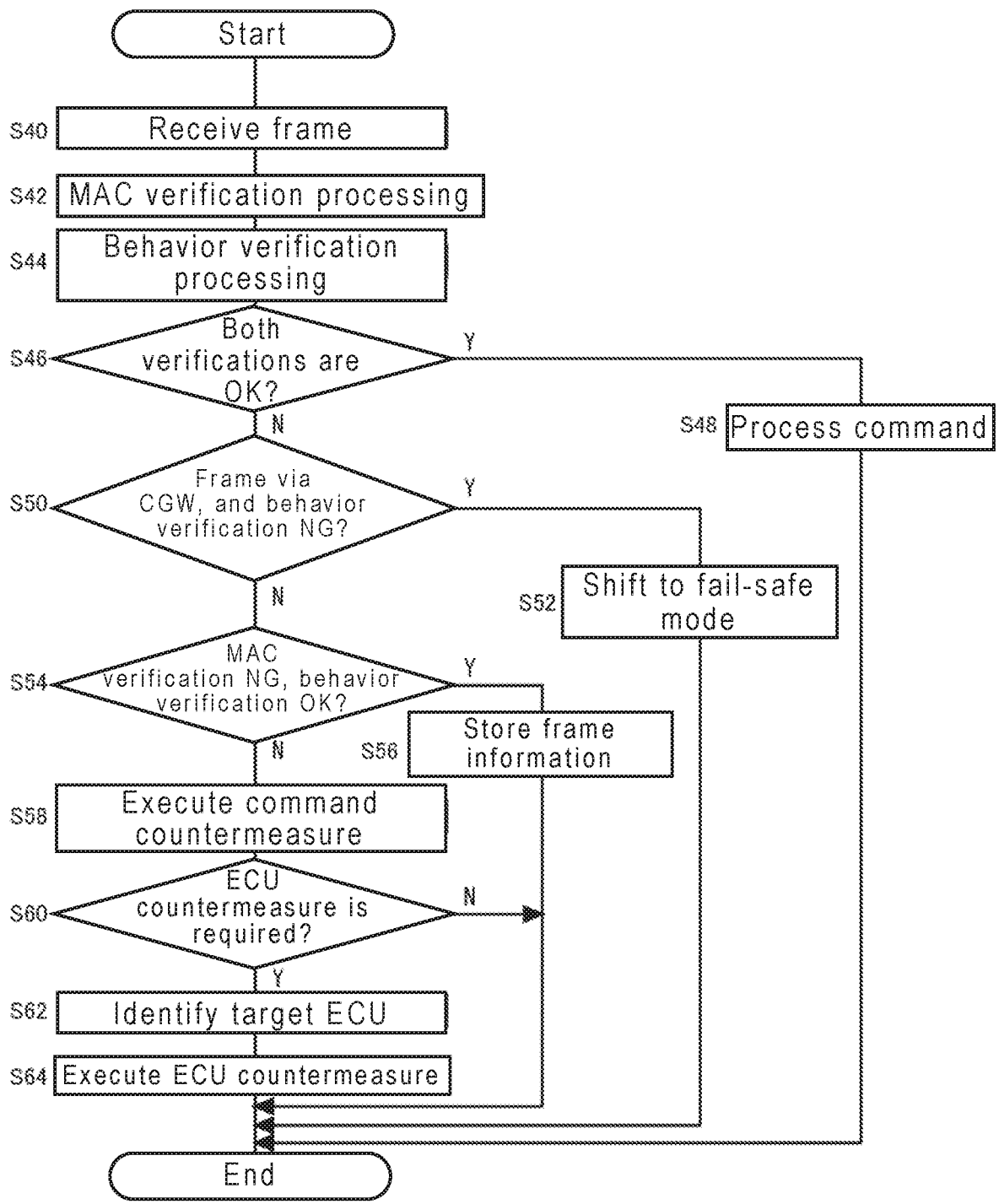
FIG. 6 is a flowchart illustrating an operation of the ECU in FIG. 1.

FIG. 6 is a flowchart illustrating an operation of ECU 14 in FIG. 1. Since processing of S40 to S44 is identical to processing of S10 to S14 in FIG. 5, description thereof will be omitted. When the target frame is determined to be legal in both the MAC verification and behavior verification (Y in S46), illegality countermeasure unit 38 delivers the target frame to command executor 56, and command executor 56 executes data processing according to a command specified by the target frame (S48). When the target frame is a frame via CGW 20 and determined to be illegal at least by the behavior verification (N in S46, Y in S50), illegality countermeasure unit 38 shifts the automatic driving of vehicle 10 to a fail-safe mode (S52). Since processing of S54 to S64 after N in S50 is identical to processing of S20 to S30 in FIG. 5, description thereof will be omitted.

According to the monitoring device (for example, ECU 14, CGW 20) of the exemplary embodiment, based on a combination of the message authentication result and behavior verification result, a type of security threat is delicately recognized and appropriate command countermeasure and ECU countermeasure corresponding to the type of security threat are automatically executed. This ensures security of in-vehicle network system 12. For example, it is possible to detect leakage of MAC key and takeover of MAC-compliant ECU and to appropriately execute update of the MAC key and reprogramming of ECU. In addition, also when ECU 14 not complying with MAC exists in in-vehicle network system 12 and ECU 14 not complying with MAC is subjected to threat, security is easily ensured.

The present invention has been described above based on the first exemplary embodiment. It will be understood by those skilled in the art that the exemplary embodiment is merely an example, various modified examples are available in each constituent element thereof or in a combination of each processing process, and such modified examples still fall within the scope of the present invention.

A first modified example will now be described. Behavior verifier 36 of the exemplary embodiment classifies the target frame into a legal frame or an illegal frame. However, as the modified example, behavior verifier 36 may classify the target frame into any of a legal frame, an illegal frame, and a gray frame according to a degree of deviation (or, a degree of matching) between a state of the target frame and a behavior rule. Log storage unit 44 of illegality countermeasure unit 38, when the target frame is classified into the gray frame, stores, as log data, rule update instructing data including the target frame and a past frame having the same ID. As already described, the rule update instructing data may include a frame having the same ID received after the target frame. Thereby, the stored log data is collected offline and notified to rule generation device 29, and rule generation device 29, for example, updates the behavior rule so that the target frame is determined to be illegal.

As a specific example, behavior verifier 36 may evaluate a target frame with each of a plurality of detection parameters, generate an intermediate determination result (a determination result on whether or not data of the target frame conforms to a rule corresponding to each detection parameter) by each detection parameter, and determine that a final determination result is illegal when four or more intermediate determination results are illegal. In addition, if the number of the intermediate determination results which are illegal is three or less, the final determination result may be determined to be legal. In this configuration, behavior verifier 36 accumulates the number of times when the intermediate determination result is illegal for each frame ID (also command ID is acceptable) specified by each frame. Behavior verifier 36 determines, as a gray frame, a frame having an ID for which the accumulated number of times when the intermediate determination result is illegal exceeds a predetermined threshold (for example, ten times).

In addition, behavior verifier 36 may accumulate the number of times when the intermediate determination result is illegal without distinguishing the frames by the frame ID (command ID), with all the frames as a population. Behavior verifier 36 may determine, as a gray frame, a frame for which the accumulated number of times when the intermediate determination result is illegal exceeds a predetermined threshold (for example, ten times). In this case, log storage unit 44 may store, as log data, rule update instructing data including all frames received during a certain period of time in the past.

It is essentially not desirable that legality of a frame is determined to be gray, but according to the first modified example, it is possible to appropriately update the behavior rule and improve security of in-vehicle network system 12. Note that, behavior verifier 36, in the behavior verification of a target frame, may determine that a final determination result of the target frame is illegal when the accumulated number of illegal determinations associated with an ID of the target frame exceeds a predetermined threshold. According to this aspect, the command countermeasure and ECU countermeasure are executed based on the frame determined to be gray, and security of in-vehicle network system 12 can be further enhanced.

Figure 7:
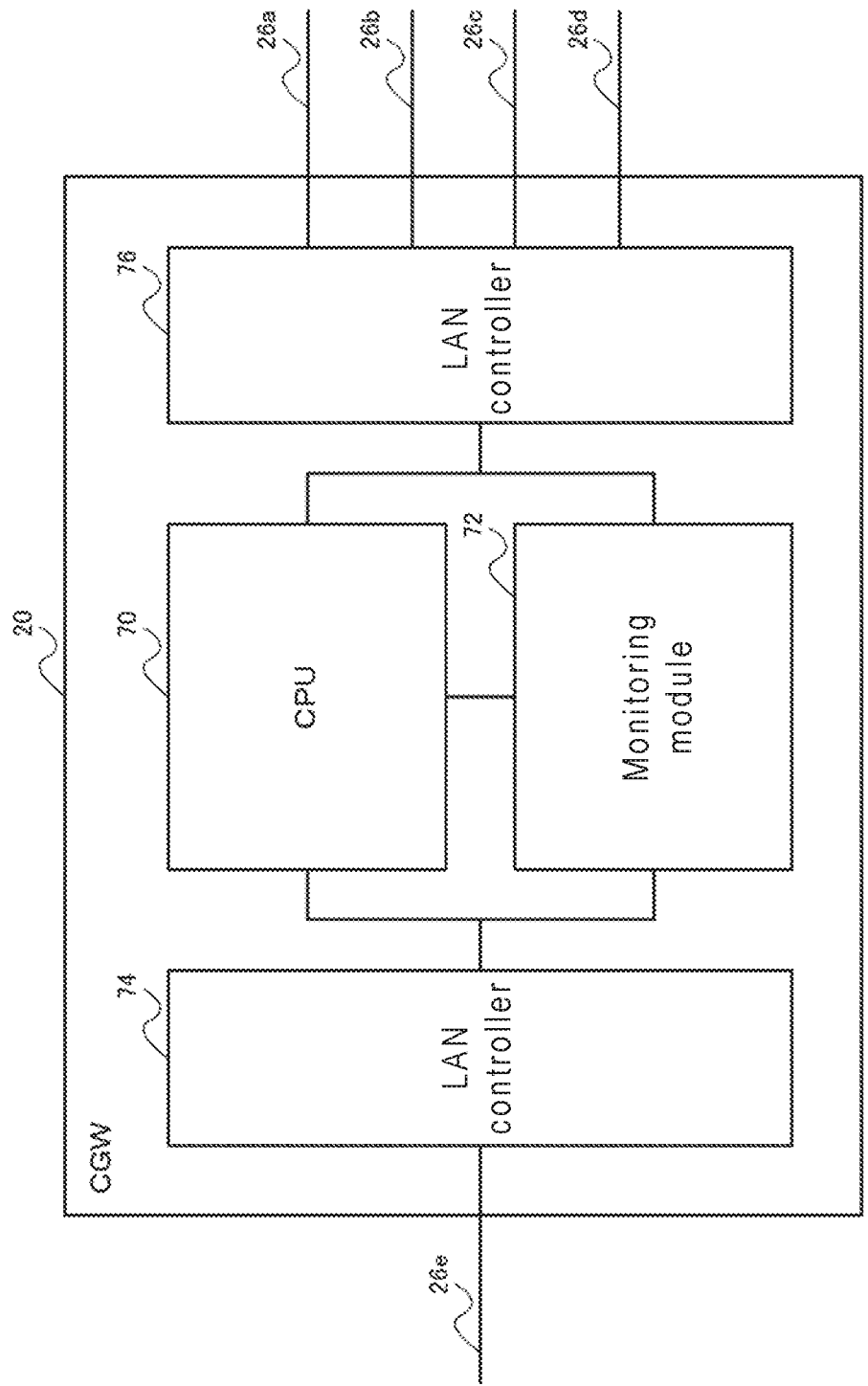
FIG. 7 is a diagram illustrating a hardware configuration of a CGW of a modified example.

A second modified example will now be described. FIG. 7 illustrates a hardware configuration of CGW 20 of the modified example. CGW 20 includes CPU 70, monitoring module 72, local area network (LAN) controller 74, and LAN controller 76. LAN controller 74 and LAN controller 76 are connected to respective buses of CAN 24. CPU 70 controls operations of entire CGW 20 and also executes functions of the functional blocks illustrated in FIG. 2.

Monitoring module 72 is a large-scale integration (LSI) physically different from CPU 70 and in other words, is the LSI mounted physically separately or independently from CPU 70. Monitoring module 72 executes functions of MAC verifier 34, behavior verifier 36, and illegality countermeasure unit 38 of the functional blocks illustrated in FIG. 2. The function of illegality countermeasure unit 38 included in monitoring module 72 includes at least a function of determining the command countermeasure and ECU countermeasure for each pattern illustrated in FIG. 4.

CPU 70 and monitoring module 72 execute illegality determination processing for the same target frame in parallel with each other. Monitoring module 72 determines whether CPU 70 is normal or not based on the result of illegality determination processing and contents of frame processing in CPU 70. For example, monitoring module 72 determines that CPU 70 (especially, routing function of CPU 70) is abnormal when a target frame is determined to be illegal in at least one of the MAC verification and behavior verification and when CPU 70 has transmitted the target frame to CAN 24. In addition, monitoring module 72 determines that CPU 70 is abnormal when a target frame is determined to be legal in both the MAC verification and behavior verification and when CPU 70 has discarded or invalidated the target frame.

When CPU 70 is determined to be abnormal, monitoring module 72 may execute at least one of predetermined error processing, recovery processing, and notification processing to an occupant, external person, or the like. According to the second modified example, even when CPU 70 of CGW 20 is taken over by an unauthorized person, the fact is detected by monitoring module 72, and processing for eliminating security threat becomes executable. CPU 70 and monitoring module 72 may be mounted virtually or logically separated from each other. In addition, the example of CGW 20 is illustrated here, but also in ECU 14 operating as a monitoring device, the configuration of this modified example is applicable.

A third modified example will now be described. In the above exemplary embodiment, the in-vehicle network is CAN, but as the modified example, the in-vehicle network may be Ethernet (registered trademark, the same applies hereafter), and in this case too, the same configuration as the exemplary embodiment is applicable to ECU 14 and CGW 20.

A fourth modified example will now be described. In relation to the third modified example, CAN and Ethernet may be mixed together in the in-vehicle network. CGW 20 as a monitoring device may further have a function of connecting CAN and Ethernet and mutually converting a frame of CAN and a frame of Ethernet. CGW 20 suppresses converting a CAN frame determined to be illegal in at least one of the MAC verification and behavior verification into an Ethernet frame. Similarly, it suppresses converting the Ethernet frame determined to be illegal into the CAN frame In addition, CGW 20 may be connected to a plurality of buses of CAN and to a plurality of buses of Ethernet. In this case, when a certain frame is determined to be illegal in at least one of the MAC verification and behavior verification, CGW 20 may suppress conversion and relay of all frames from a bus on which the frame flows to another bus. Furthermore, CGW 20 may suppress conversion and relay of all frames from another bus to a bus on which a frame determined to be illegal flows.

Furthermore, CGW 20 may have security functions (for example, a firewall function, a MAC address filter, and the like) in the Ethernet. CGW 20 may handle the case where the target frame is determined to be illegal in at least one of the security function and MAC verification in the Ethernet equally to the case where the target frame is determined to be illegal in the MAC verification in the exemplary embodiment. Note that, CGW 20, when the target frame is determined to be illegal in both the security function and MAC verification in the Ethernet, may determine that accuracy of illegality is high and shift the mode of automatic driving of vehicle 10 to a fail-safe mode instead of executing the command countermeasure and ECU countermeasure or together with executing the command countermeasure and ECU countermeasure. Note that, the fourth modified example is applicable not only to CGW 20 but to whole devices that connect different types of networks.

A fifth modified example will now be described. A security chip (trusted platform module, hereinafter called "TPM") that determines presence or absence of tampering of own device may be mounted in ECU 14 and CGW 20 of in-vehicle network system 12. Target detector 50 of the monitoring device (for example, CGW 20, ECU 14) may make an inquiry about presence or absence of tampering to a TPM of the ECU that has transmitted the frame determined to be illegal in at least behavior verification (Attestation). Note that, in combination with the second modified example, target detector 50 may make an inquiry about presence or absence of tampering to a system on chip (SoC) of CGW 20. Target detector 50, when a result of inquiring indicates presence of tampering, determines that a device of inquiry destination (for example, CGW 20, ECU 14) is illegal, in other words, is a target device of illegality countermeasure.

The technique disclosed in the first exemplary embodiment and modified example may be identified by the following items.

[Item 1]

The monitoring device includes a receiver and a processor. The receiver receives a frame from a communication network. The processor performs a first determination that determines whether the frame is illegal based on a result of message authentication for the frame and a second determination that determines whether the frame is illegal based on a state of the frame and a predetermined rule. In addition, the processor executes, according to a combination of a result of the first determination and a result of the second determination, at least one of processing for the frame and processing for a transmission source device of the frame.

According to the monitoring device, security of a communication system can be improved.

[Item 2]

When a determination target frame is determined to be legal by the first determination and the determination target frame is determined to be illegal by the second determination, or when the determination target frame is determined to be illegal by the first determination and the determination target frame is determined to be illegal by the second determination, the processor may execute processing of discarding or invalidating the determination target frame.

According to this aspect, a security risk due to the illegal frame can be reduced.

[Item 3]

When a determination target frame is determined to be legal by the first determination and the determination target frame is determined to be illegal by the second determination, or when the determination target frame is determined to be illegal by the first determination and the determination target frame is determined to be illegal by the second determination, the processor may detect a target device of illegality countermeasure from among a plurality of transmission source devices based on presence or absence of illegality in a plurality of frames transmitted from a plurality of transmission source devices. In addition, in these cases, the processor may execute at least one of (1) processing of discarding or invalidating a frame transmitted from the target device, (2) processing of updating a computer program in the target device, (3) processing of updating a message authentication key in a transmission source device other than the target device, and (4) processing of discarding or invalidating a frame received from a bus of a communication network to which the target device is connected.

According to this aspect, it is possible to perform illegality countermeasure related to a transmission source device of a frame based on detection of an illegal frame.

[Item 4]

When a determination target frame is determined to be legal by the first determination and the determination target frame is determined to be illegal by the second determination, and when the determination target frame is received from a bus in which a frame transmitted from other than a predetermined transmission source device flows, the processor may execute processing of updating a message authentication key in the predetermined transmission source device.

According to this aspect, when there is a possibility that an illegal frame is injected from outside and a message authentication key is leaked, it is possible to reduce a security risk by updating the message authentication key.

[Item 5]

When a determination target frame is determined to be illegal by the first determination and the determination target frame is determined to be legal by the second determination, the processor may store at least log data related to the determination target frame.

According to this aspect, when it is assumed that a rule for the second determination is incomplete, improvement of the rule can be supported.

[Item 6]

The processor may classify, according to a degree of deviation between a state of a determination target frame and a rule, the determination target frame into any of a legal frame, an illegal frame, and a gray frame, and when the determination target frame is classified into the gray frame, store at least log data related to the determination target frame.

According to this aspect, based on the essentially undesirable gray determination, improvement of the rule for the second determination can be supported.

[Item 7]

The monitoring device may be an electronic control unit mounted in a vehicle. The processor, when a frame transmitted via a predetermined gateway device in an in-vehicle network is determined to be illegal by the second determination, may switch a mode of automatic driving of the vehicle to a fail-safe mode.

According to this aspect, safety of vehicle driving can be further enhanced.

[Item 8]

The monitoring method executed by a computer includes receiving a frame from a communication network. In addition, the monitoring method includes performing a first determination that determines whether the frame is illegal based on a result of message authentication for the received frame and a second determination that determines whether the frame is illegal based on a state of the received frame and a predetermined rule. Further, the monitoring method includes executing, according to a combination of a result of the first determination and a result of the second determination, at least one of processing for the received frame and processing for a transmission source device of the received frame.

According to this monitoring method, security of a communication system can be improved.

[Item 9]

The computer program causes a computer to execute receiving a frame from a communication network. In addition, the computer program causes a computer to perform a first determination that determines whether the frame is illegal based on a result of message authentication for the received frame and a second determination that determines whether the frame is illegal based on a state of the received frame and a predetermined rule. Further, the computer program causes the computer to execute, according to a combination of a result of the first determination and a result of the second determination, at least one of processing for the received frame and processing for a transmission source device of the received frame.

According to this computer program, security of a communication system can be improved.

Second Exemplary Embodiment

Prior to description of the second exemplary embodiment, problems found in a conventional technology will briefly be described. From now on, with widespread use of a vehicle always connected to the Internet, it is conceivable that a device group (hereinafter, also called a "cloud") connected to a vehicle via the Internet always monitors a security state of the vehicle. Such a vehicle using a cloud service is required to notify the cloud of the security state of the own vehicle, but excessive increase of communication volume is not preferable.

Prior to description of a detailed configuration of the second exemplary embodiment, its outline will be first described. With widespread use of a vehicle always connected to the Internet, such as a connected car, it is conceivable that a cloud side always monitors a vehicle, and an appropriate service is provided from the cloud to the vehicle. Such a vehicle using a cloud service is required to notify the cloud of the security state of the own vehicle in real time, but the more real-time property is emphasized, the more communication volume increases. Therefore, a vehicle is required to perform appropriate communication according to a detection result of the security state.

In the second exemplary embodiment, an in-vehicle network system will be described in which a security state of a vehicle is determined based on the result of MAC verification and the result of behavior verification, and according to the security state of the vehicle, the security state is transmitted to a cloud at an appropriate timing and with appropriate contents. In the following drawings, to a block identical to or corresponding to that of the first exemplary embodiment, the same code as that of the first exemplary embodiment is attached. In addition, the contents already described in the first exemplary embodiment are appropriately omitted, and mainly a configuration different from that of the first exemplary embodiment will be described.

Figure 8:
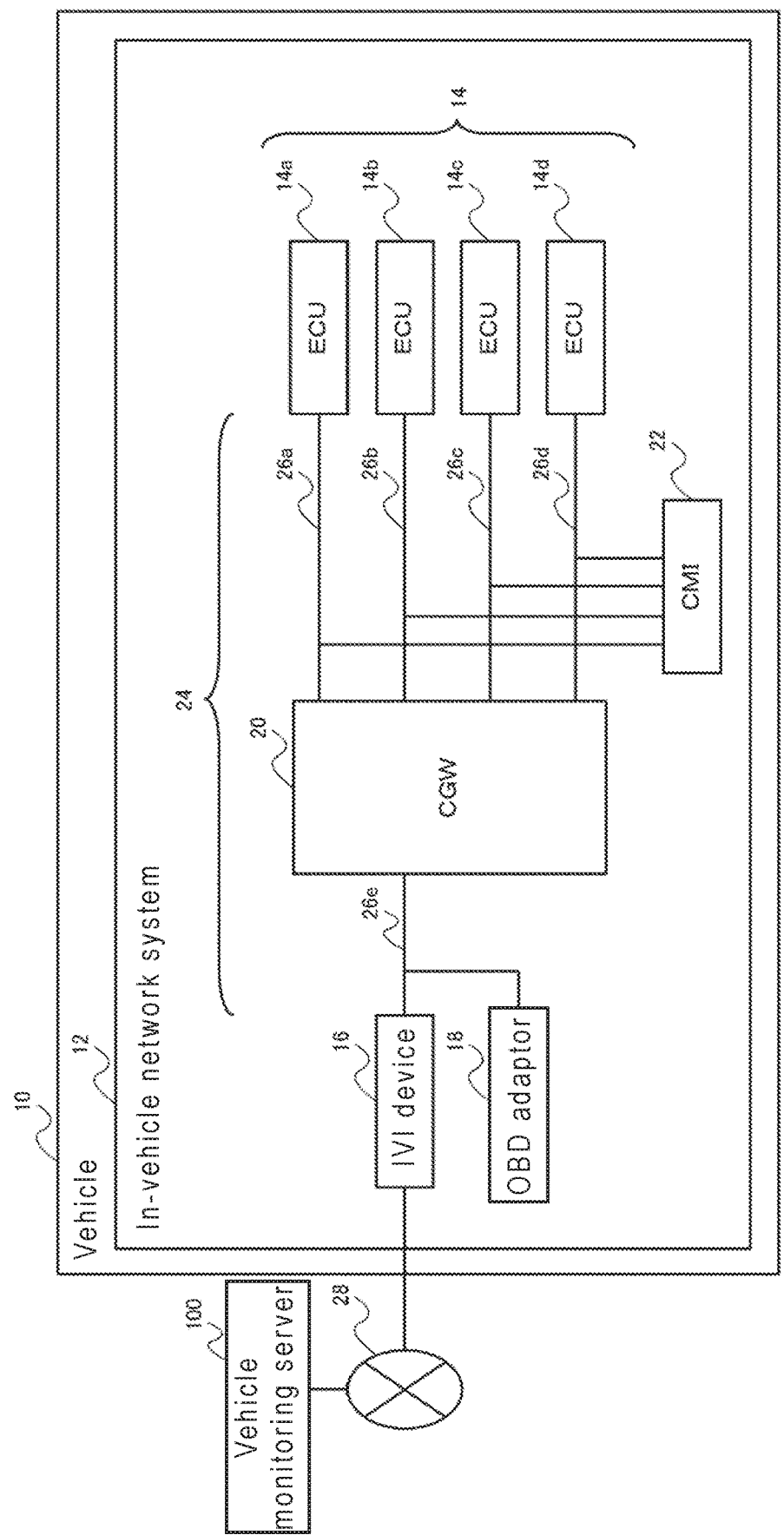
FIG. 8 is a diagram illustrating a configuration of an in-vehicle network system according to a second exemplary embodiment.

FIG. 8 illustrates a configuration of an in-vehicle network system according to the second exemplary embodiment. A hardware configuration of in-vehicle network system 12 is the same as that of the first exemplary embodiment. In the second exemplary embodiment, vehicle 10 is connected to vehicle monitoring server 100 via external communication network 28.

Vehicle monitoring server 100 provides a service corresponding to the security state of vehicle 10. Vehicle monitoring server 100 may have a function corresponding to illegality countermeasure unit 38 mounted in CGW 20, ECU 14, and the like in the first exemplary embodiment. For example, vehicle monitoring server 100 may instruct vehicle 10 to perform reprogramming or key updating of ECU 14 according to the security state of vehicle 10, which is notified from vehicle 10. Note that, vehicle monitoring server 100 includes a function of rule generation device 29 of the first exemplary embodiment.

In in-vehicle network system 12 of the second exemplary embodiment, a monitoring module is introduced into ECU 14 complying with message authentication using MAC. ECU 14 into which the monitoring module has been introduced functions as a monitoring device that monitors an illegal frame (in other words, an illegal command) flowing in CAN 24 and notifies vehicle monitoring server 100 of the monitoring result. As a modified example, (i) only CGW 20 may be configured to introduce the monitoring module, (ii) only CMI 22 may be configured to introduce the monitoring module, and (iii) CGW 20 and ECU 14 complying with message authentication using MAC may be configured to introduce the monitoring module.

Figure 9:
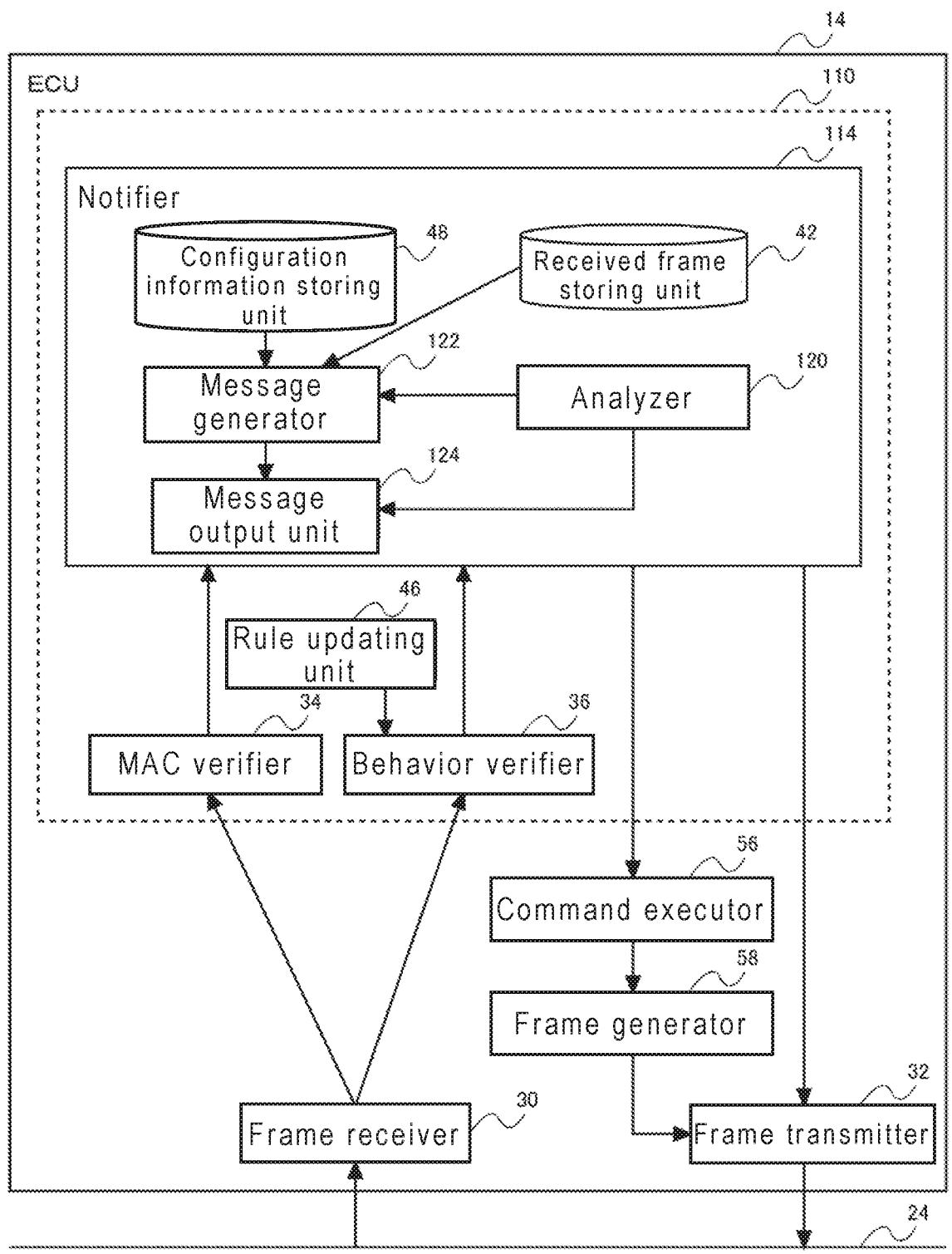
FIG. 9 is a block diagram illustrating a functional configuration of an ECU in FIG. 8.

FIG. 9 is a block diagram illustrating a functional configuration of ECU 14 in FIG. 8. ECU 14 includes frame receiver 30, frame transmitter 32, MAC verifier 34, behavior verifier 36, rule updating unit 46, command executor 56, frame generator 58, and notifier 114. When CGW 20 or CMI 22 in FIG. 8 has a monitoring module, too, the configuration is the same as that of FIG. 9.

MAC verifier 34, behavior verifier 36, rule updating unit 46, and notifier 114 in FIG. 9 may constitute processor 110 as a monitoring module. In addition, functions of frame receiver 30, frame transmitter 32, MAC verifier 34, behavior verifier 36, rule updating unit 46, command executor 56, and frame generator 58 in FIG. 9 are the same as those of the first exemplary embodiment, and thus the description thereof is omitted.

Notifier 114 receives a frame received from CAN 24 (hereinafter, also called a "target frame") from frame receiver 30. Further, notifier 114 acquires a result of MAC verification for the target frame from MAC verifier 34 and acquires a result of behavior verification for the target frame from behavior verifier 36. Notifier 114, based on a combination of the result of MAC verification and the result of behavior verification for the target frame, sets contents to be notified to vehicle monitoring server 100 or priority of notification, and changes contents to be notified to vehicle monitoring server 100 or priority of notification between a plurality of target frames. In the exemplary embodiment, both the contents to be notified and priority of notification are changed.

Notifier 114 includes received frame storing unit 42, configuration information storing unit 48, analyzing unit 120, message generator 122, and message output unit 124.

Received frame storing unit 42 stores and accumulates a plurality of frames received by frame receiver 30 in a predetermined storage area. Received frame storing unit 42 may sequentially delete, from the storage area, frames that have stayed for a (preset) predetermined time after being received. Received frame storing unit 42 may associate data of a frame with a determination result by MAC verifier 34 and a determination result by behavior verifier 36 and accumulate them.

Configuration information storing unit 48 stores attribute information on various constituent elements (here, called "configuration information") of CAN 24. The configuration information of the exemplary embodiment includes IDs of a plurality of ECUs 14 and command IDs included in frames transmitted by each of the plurality of ECUs 14. Note that, the configuration information may include a frame ID (in other words, CAN-ID) in place of the command ID. Alternatively, the configuration information may include a frame ID (CAN-ID) together with a command ID.

In addition, the configuration information of the exemplary embodiment includes information that associates a plurality of command IDs with a transmission frequency of each command. The transmission frequency of a command may be a frequency (for example, the number of transmissions per unit time) at which an ECU of a transmission source transmits a frame including the command. In addition, the configuration information of the exemplary embodiment includes information that associates a plurality of command IDs with an ID of another command related to each command. The another command related to a specific command may be another command having dependency with a specific command or may be another command to be transmitted as a pair with a specific command. For example, another command related to a vehicle speed control command may be a brake actuator control command.

Analyzing unit 120 discriminates an illegality detection pattern of a target frame based on a combination of the result of MAC verification and the result of behavior verification for the target frame. FIG. 10 illustrates illegality detection patterns. Analyzing unit 120 identifies any of seven illegality detection patterns illustrated in FIG. 10 as an illegality detection pattern of the target frame.

A discrimination method of pattern 1 and pattern 5 will be described. Analyzing unit 120, when the MAC verification result for a frame including a certain command ID (a frame ID may be used) indicates legal (OK in FIG. 10) and the behavior verification result indicates illegal (NG in FIG. 10), refers to received frame storing unit 42 and identifies a reception frequency of the frame including the command ID. When the identified reception frequency matches with the transmission frequency of the command ID stored in configuration information storing unit 48 (for example, the difference between the identified reception frequency and the transmission frequency of the command ID falls within a predetermined range), the illegality detection pattern of the target frame is discriminated as pattern 1. On the other hand, when the identified reception frequency exceeds the transmission frequency (for example, the difference between the identified reception frequency and the transmission frequency of the command ID exceeds a predetermined threshold), the illegality detection pattern of the target frame is discriminated as pattern 5.

The reason of discriminating the pattern in this way is that when the ECU is taken over (pattern 1), the transmission frequency does not change, but when the illegal command is injected from outside (pattern 5), both a command transmitted by the normal ECU and a command injected from outside are present and thus the reception frequency is increased.

A discrimination method of pattern 3 and pattern 4 will be described. A target frame that can be classified into pattern 3 or pattern 4 is a frame to which a MAC code value is not added, in other words, a frame to which MAC verification by MAC verifier 34 is not applied. Analyzing unit 120, when the MAC verification result for a frame including a certain command ID (a frame ID may be used) is not applicable (n/a in FIG. 10) and the behavior verification result indicates illegal (NG in FIG. 10), refers to received frame storing unit 42 and identifies a reception frequency of the frame including the command ID. When the identified reception frequency matches with the transmission frequency of the command ID stored in configuration information storing unit 48, the illegality detection pattern of the target frame is discriminated as pattern 3. On the other hand, when the identified reception frequency exceeds the transmission frequency, the illegality detection pattern of the target frame is discriminated as pattern 4.

Analyzing unit 120, when having discriminated pattern 1 or pattern 3 as the illegality detection pattern of the target frame, identifies an ID of the ECU with a possibility of having been taken over. For example, analyzing unit 120 refers to configuration information storing unit 48 and identifies an ECU associated with the command ID indicated by the target frame as the ECU with a possibility of having been taken over. Note that, takeover of an ECU includes execution of an unanticipated program in the ECU.

Returning to FIG. 9, message generator 122 generates a message for notifying vehicle monitoring server 100 of information on the target frame according to the illegality detection pattern of the target frame discriminated by analyzing unit 120. The message indicates a security state of vehicle 10. Message generator 122 includes notification contents and additional information of FIG. 10 corresponding to the illegality detection pattern of the target frame in the message.

Message generator 122 generates a notification frame that is a frame in which the message is set in a payload for notifying vehicle monitoring server 100 of a security state (specifically, an illegality detection state) of vehicle 10. Message generator 122 may divide the message into a plurality of messages and generate a plurality of notification frames including the divided messages, respectively. Message output unit 124 outputs the notification frames generated by message generator 122 to frame transmitter 32, and causes frame transmitter 32 to output it to CAN 24. The notification frames are transmitted to vehicle monitoring server 100 via CAN 24, external bus 26e, and external communication network 28.

The detail of setting processing of the message contents will be described. When the illegality detection pattern of the target frame is pattern 1, message generator 122 includes the notification contents of pattern 1 of FIG. 10 in the message. Further, message generator 122 includes additional information (A), (B), and (C) in the message. Note that, in any of the patterns, texts in a column "conceivable threats" of FIG. 10 may be included in the message in place of texts in a column "notification contents" of FIG. 10.

Specifically, message generator 122 includes the results of MAC verification and behavior verification in the message as the additional information (A). In addition, message generator 122 includes a command ID included in the target frame in the message as the additional information (B). Message generator 122 includes an ID of the ECU (here, called an "illegal ECU") identified by analyzing unit 120 in the message as the additional information (C). Further, message generator 122 refers to configuration information storing unit 48, identifies a command ID associated with the illegal ECU, that is, a command ID transmitted by the illegal ECU, and includes the command ID in the message as the additional information (C).

When the illegality detection pattern of the target frame is pattern 2, message generator 122 includes only the additional information (A) and (B) in the message. This is because both the MAC verification and behavior verification are active, and there are fewer problems than in case of pattern 1 (that is, in this case, reduction of additional information enhances reduction effect of communication volume). As the modified example, additional information (that is, (A) to (C)) similar to that of pattern 1 may be included in the message.

Next, processing of message generator 122 when the illegality detection pattern of the target frame is pattern 6 will be described. As is mentioned also in the first exemplary embodiment, pattern 6 has a possibility that the behavior verification, which should be essentially NG, is determined to be OK, that is, there is a possibility that the behavior verification rule is incomplete. Message generator 122 includes the notification contents of pattern 6 of FIG. 10 in the message. Further, message generator 122 includes additional information (A), (B), (D), and (E) in the message.

Specifically, message generator 122 refers to received frame storing unit 42 and identifies a predetermined number of (for example, ten) frames to which the same ID as the frame ID of the target frame is set and which have been received before the target frame. In addition, message generator 122 refers to received frame storing unit 42 and identifies a predetermined number of (for example, ten) frames to which the same ID as the frame ID of the target frame is set and which have been received after the target frame. Message generator 122 includes a command ID included in each identified frame in the message as the additional information (D). As the modified example, message generator 122 may include whole data of the predetermined number of frames received before and after the target frame in the message as the additional information (D).

Further, message generator 122 refers to information stored in configuration information storing unit 48, identifies another command ID related to a command included in the target frame, and includes the another command ID in the message as the additional information (E). As the modified example, message generator 122 may include whole data of the predetermined number of frames including the another command ID in the message as the additional information (E).

Note that, message generator 122 generates a first message including notification contents and additional information (A) and (B) and a second message including additional information (D) and (E) separately. The messages are generated in this way because as described below, a notification timing of the first message and a notification timing of the second message are different from each other.

Message generator 122 does not generate a frame when the illegality detection pattern of the target frame is pattern 7. However, when a state in which the illegality detection pattern is pattern 7 continues for a predetermined time or more, message generator 122 may generate a frame indicating no abnormality in the security periodically (for example, every time when one minute passes).

Next, the detail of setting processing of priority of notification will be described. Message generator 122 sets a priority (FIG. 10) corresponding to the illegality detection pattern of the target frame to the notification frame. Message generator 122, when the illegality detection pattern of the target frame is pattern 1 or 5, sets, to the notification frame, the priority to high, that is, sets a priority higher than that of another communication other than the notification frame. This is because pattern 1 or 5 has a high possibility that the MAC key is leaked, or the ECU is taken over and thus a quick countermeasure should be taken.

In addition, when the illegality detection patterns of the target frame are patterns 2 to 4, message generator 122 sets the priority to low, that is, sets, to the notification frame, a priority lower than that of another communication other than the notification frame. This is because in patterns 2 to 4, an illegal command can be detected without any problems. In addition, this is because MAC is not given to the determination target frames of patterns 3 and 4, and the determination target frame to which MAC is not given has low importance in operation.

When the illegality detection pattern of the target frame is pattern 6, message generator 122 sets the priority of a frame of the first message including the notification contents and additional information (A) and (B) to middle. That is, the priority equivalent to that of another communication other than the notification frame is set to the notification frame. This is because since the MAC verification is NG, damage due to the illegal command can be avoided, but the behavior verification is OK and thus the rule of behavior verification should be improved. Message generator 122 sets the priority of a frame of the second message including the additional information (D) and (E) to low. This is because the additional information (D) and (E) have large data volume. However, when the communication volume of CAN 24 and the like is small, the priority of a frame of the second message including the additional information (D) and (E) may be set to middle.

Message generator 122 may give an ID that is preferentially transmitted in CAN 24 to the notification frame the priority of which is set to high. Message output unit 124 may output a notification frame the priority of which is set to high to CAN 24 immediately regardless of whether another frame is being transmitted or not. In addition, message generator 122 may give data instructing to transmit a notification frame the priority of which is set to high to IVI device 16 connected to external communication network 28 in preference to another communication. The another communication may include transmission and reception of information necessary for automatic driving of vehicle 10, for example, may include upload and download of dynamic map or marker information.

Message generator 122 may give an ID that is handled with a priority equivalent to that of another type of frame in CAN 24 to a notification frame the priority of which is set to middle. Message output unit 124 may output a notification frame the priority of which is set to middle to CAN 24 while another frame is not transmitted. In addition, message generator 122 may give, to a notification frame the priority of which is set to middle, data instructing IVI device 16 to transmit the notification frame while handling it with a priority equivalent to that of another communication (for example, transmit on a first-come first-served basis).

Message generator 122 may give an ID that is handled with a priority lower than that of another type of frame in CAN 24 to a notification frame the priority of which is set to low. Message output unit 124 may output a notification frame the priority of which is set to low to CAN 24 during an idle time of communication, such as ignition off or power off. In addition, message generator 122 may give, to a notification frame the priority of which is set to low, data instructing IVI device 16 to transmit the notification frame with a priority lower than that of another communication. For example, message generator 122 may give, to a notification frame the priority of which is set to low, data instructing IVI device 16 to transmit the notification frame to vehicle monitoring server 100 during idling of communication processing.

Note that, message generator 122 may store a notification frame the priority of which is set to other than high, in a nonvolatile memory as log similarly to the first exemplary embodiment. Message output unit 124, when transmission of a notification frame is possible, for example when CAN 24 is empty, may read a notification frame stored in the nonvolatile memory and output the notification frame to CAN 24.

A case in which vehicle 10 is connected to a plurality of types of communication networks will be described. For example, vehicle 10 may have a plurality of communication devices, and, for example, may have IVI device 16, a telematics communication unit (TCU) (not illustrated), and an emergency communication unit (not illustrated). IVI device 16 may be connected to a wireless fidelity (WiFi) (registered trademark). The TCU may be connected to a 4G/LTE (Long Term Evolution) (registered trademark) network. The emergency communication unit may be connected to a 3G network. It will be understood by a person skilled in the art that a combination of the above-described communication network and each device is an example, and other combinations are also available.

In vehicle 10, when the priority of notification is high, notification processing may be executed by using the emergency communication unit. In addition, when the priority of notification is middle, the notification processing may be executed by using the TCU. When the priority of notification is low, the notification processing may be executed by using IVI device 16. Alternatively, when the priority of notification is low, the notification processing may be executed by selecting an unoccupied communication network among the plurality of types of communication networks. On the other hand, when the priority of notification is high, use of a high-speed communication network by another communication is stopped and the notification processing may be executed by using the high-speed communication network. It will be understood by a person skilled in the art that a combination of the above-mentioned setting of priority and each processing is an example, and other combinations are also available.

Figure 11:
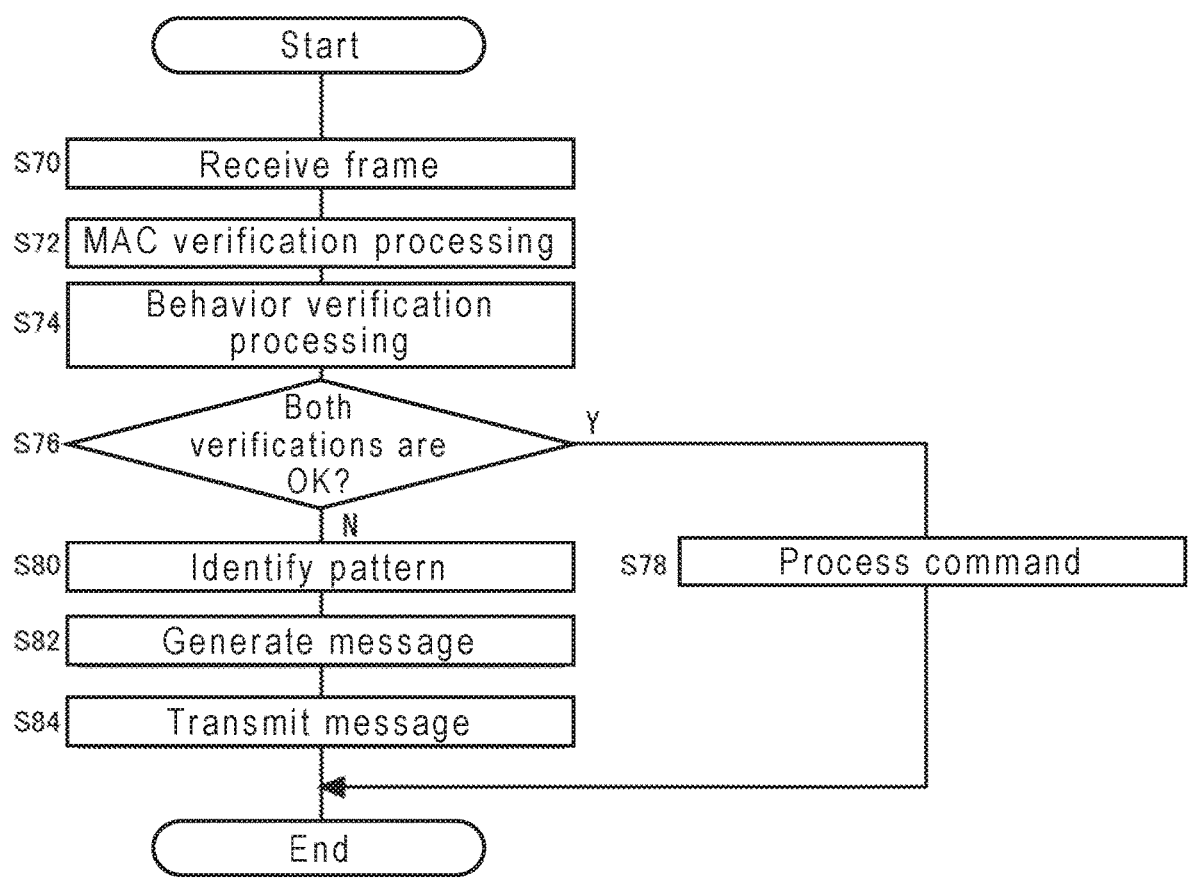
FIG. 11 is a flowchart illustrating an operation of the ECU in FIG. 8.

An operation of ECU 14 configured as described above will now be described. FIG. 11 is a flowchart illustrating an operation of ECU 14 in FIG. 8. Frame receiver 30 receives a frame from CAN 24 (S70). MAC verifier 34 executes MAC verification for the received target frame and determines whether the target frame is legal or illegal (S72). Behavior verifier 36 executes behavior verification for the received target frame and determines whether the target frame is legal or illegal (S74).

When the target frame is determined to be legal by both the MAC verification and the behavior verification (Y in S76), message output unit 124 of notifier 114 delivers the target frame to command executor 56. Command executor 56 executes data processing according to a command specified by the target frame (S78).

In addition, when a state in which the target frame is determined to be legal in both the MAC verification and behavior verification continues, message generator 122 periodically generates a frame indicating that the security state of vehicle 10 is normal. Message output unit 124 transmits the frame to vehicle monitoring server 100.

When the target frame is determined to be illegal in at least one of the MAC verification and behavior verification (N in S76), analyzing unit 120 of notifier 114 identifies one pattern from among seven patterns of FIG. 10 as an illegality detection pattern of the target frame (S80). Message generator 122 sets a message to be notified to vehicle monitoring server 100 and a priority of notification according to the identified illegality detection pattern of the target frame (S82). Message output unit 124 transmits a notification frame including the message generated by message generator 122 to vehicle monitoring server 100 depending on the priority set by message generator 122 (S84). In this way, notifier 114 changes contents and a priority of the notification frame according to the illegality detection pattern for each frame in which illegality is detected.

When the illegality detection pattern of the target frame is pattern 1 or 5 (high priority), a communication unit (not illustrated) of vehicle 10 may process a notification frame in preference to download and upload (hereinafter, called "another communication") of dynamic map for automatic driving and transmit the notification frame to vehicle monitoring server 100. In addition, when the illegality detection pattern of the target frame is pattern 6, the communication unit may process the notification frame with a priority equivalent to that of another communication (for example, on a first-come first-served basis). When the illegality detection patterns of the target frame are patterns 2 to 4, the communication unit may put off the processing of the notification frame if another communication is being processed.

According to ECU 14 of the second exemplary embodiment, it is possible to notify vehicle monitoring server 100 of appropriate contents at an appropriate timing corresponding to the security state of vehicle 10 (in other words, each device in in-vehicle network system 12).

The present invention has been described above based on the second exemplary embodiment. It will be understood by those skilled in the art that the exemplary embodiment is merely an example, various modified examples are available in each constituent element thereof or in a combination of each processing process, and such modified examples still fall within the scope of the present invention.

A first modified example will now be described. The present modified example corresponds to a first modified example of the first exemplary embodiment. Behavior verifier 36, based on a state of a target frame and a plurality of predetermined rules, executes a plurality of intermediate determinations and derives a result of behavior verification according to results of the plurality of intermediate determinations. Behavior verifier 36 outputs the results of the plurality of intermediate determinations to notifier 114 together with the result of behavior verification. Message generator 122, when there is a result indicating non-conformity with the rule among the results of plurality of intermediate determinations, generates a notification frame including the results of plurality of intermediate determinations. Message output unit 124 transmits the notification frame to vehicle monitoring server 100. In addition, message generator 122 changes the priority of notification depending on the number of intermediate determination results indicating non-conformity with the rule.

As a specific example, behavior verifier 36 may evaluate data of one target frame with each of a plurality of detection parameters, and generate an intermediate determination result (a determination result on whether or not data of the target frame conforms to a rule corresponding to each detection parameter) by each detection parameter. Behavior verifier 36 may determine that the final determination result of the target frame is illegal if the number of intermediate determination results which indicate NG is three or more among the plurality of intermediate determination results. NG includes, for example, a case where the data of determination target frame does not conform to the rules of individual intermediate determinations 1) The notification processing by frame unit will be described. Message generator 122, when there are one or more results indicating non-conformity with the rule among the plurality of intermediate determination results, may generate a notification frame including all intermediate determination results. The intermediate determination result may include information on parameters used in the intermediate determination, and also may include data of a frame determined to be legal or not in the intermediate determination. In addition, message generator 122 may change the priority of notification to vehicle monitoring server 100 depending on the number of intermediate determination results indicating NG. For example, when five intermediate determinations are performed, if the number of intermediate determination results indicating NG is one or two, the priority of the exemplary embodiment may be set to low. In addition, if the number of intermediate determination results indicating NG is three or four, the priority of the exemplary embodiment may be set to middle, and if the number of intermediate determination results indicating NG is five, the priority may be set to high.

Next, 2) the notification processing by command unit will be described. Message generator 122 may store, for each command ID (or for each frame ID), a cumulative total value of the number of intermediate determination results indicating NG (here, called a "command-based intermediate cumulative number of NGs") by behavior verifier 36. Message generator 122, when the command-based intermediate cumulative number of NGs has exceeded a first threshold (for example, 20 times), may generate a notification frame including information that the command-based intermediate cumulative number of NGs has exceeded the first threshold and a command ID and set the priority of notification to low. In addition, message generator 122, when the command-based intermediate cumulative number of NGs has exceeded a second threshold (for example, 40 times), may generate a notification frame including information that the command-based intermediate cumulative number of NGs has exceeded the second threshold and a command ID and set the priority of notification to middle.

Next, 3) the notification processing as whole vehicle 10 will be described. Message generator 122 may store, regardless of the command ID, a cumulative total value of the number of intermediate determination results indicating NG (here, called a "whole intermediate cumulative number of NGs") that is input from behavior verifier 36 for a plurality of commands (a plurality of target frames). Message generator 122, when the whole intermediate cumulative number of NGs has exceeded a first threshold (for example, 100 times), may generate a notification frame including information that the whole intermediate cumulative number of NGs has exceeded the first threshold and set the priority of notification to low. In addition, message generator 122, when the whole intermediate cumulative number of NGs has exceeded a second threshold (for example, 200 times), may generate a notification frame including information that the whole intermediate cumulative number of NGs has exceeded the second threshold and set the priority of notification to middle.

A second modified example will be described. A combination of any constituent element of the first exemplary embodiment and any constituent element of the second exemplary embodiment is available. For example, as described in the first exemplary embodiment, CGW 20 of vehicle 10 may have a function of discarding or invalidating a frame determined to be illegal by the MAC verification and behavior verification. In the second exemplary embodiment described above, configuration information storing unit 48 of ECU 14 stores configuration information associating a command ID with an ECU-ID that transmits the command. As the modified example, configuration information storing unit 48 may store, for a command transmitted by an ECU connected to a bus of CAN 24 different from own machine, configuration information associating the command ID with an ID of CGW 20. This is because a frame transmitted from the ECU connected to a bus of CAN 24 different from own machine is relayed by CGW 20.

Analyzing unit 120 of the second modified example, when an illegality detection pattern of a target frame is pattern 1 or 3, and the target frame has been received via CGW 20, identifies an ID of CGW 20 as an ECU having a possibility of being taken over. Specifically, the configuration information of configuration information storing unit 48 associates a command ID included in the target frame with an ID of CGW 20. Analyzing unit 120, when the target frame has been received via CGW 20, identifies an ID of CGW 20 by referring to the configuration information. Message generator 122 generates a notification frame indicating that CGW 20 has a possibility of being taken over.

As already described, if CGW 20 is operating normally, an illegal frame is discarded or invalidated. Thus, when illegality of the frame relayed by CGW 20 is detected in ECU 14, the operation of CGW 20 is abnormal and there is a possibility of being taken over. According to an aspect of the present modified example, an abnormality of CGW 20 can be detected accurately and can be notified to vehicle monitoring server 100. Note that the configuration of the second modified example is also applicable when a monitoring module is introduced to CMI 22.

Techniques disclosed in the second exemplary embodiment and the modified examples may be identified by the following items.

[Item 1]

The monitoring device includes a receiver and a processor. The receiver receives a frame from a communication network. The processor performs a first determination that determines whether the frame is illegal based on a result of message authentication for the frame and a second determination that determines whether the frame is illegal based on a state of the frame and a predetermined rule. In addition, the processor changes, according to a combination of a result of the first determination and a result of the second determination, at least one of the content to be notified to the external device and the priority of notification.

According to this monitoring device, notification to the external device can be executed with appropriate contents or at an appropriate timing corresponding to a security state of the own device.

[Item 2]

When a determination target frame is determined to be legal by the first determination and the determination target frame is determined to be illegal by the second determination, the processor may set a priority of notification of information related to the determination target frame to a higher priority than another communication.

According to this aspect, when there is a risk of leakage of a message authentication key, notification to the external device can be executed rapidly.

[Item 3]

When a determination target frame is determined to be illegal by the first determination and the determination target frame is determined to be illegal by the second determination, the processor may set a priority of notification of information related to the determination target frame to a lower priority than another communication.

According to this aspect, when the determination target frame is determined to be illegal by both the first determination and the second determination, since damage due to the illegal frame can be avoided, a notification suppressing another communication from being disturbed can be realized.

[Item 4]

When a determination target frame is determined to be illegal by the first determination and the determination target frame is determined to be legal by the second determination, the processor may set the priority as in the following. That is, in this case, the processor may set the priority with which information related to a determination target frame is notified to a lower priority than when the determination target frame is determined to be legal by the first determination and the determination target frame is determined to be illegal by the second determination, and to a higher priority than when the determination target frame is determined to be illegal by the first determination and the determination target frame is determined to be illegal by the second determination.

According to this aspect, since illegality is detected by the first determination, damage due to the illegal frame can be avoided, but there is a possibility that the rule of the second determination is incomplete, and therefore notification with a priority of an intermediate level can be realized.

[Item 5]

When a determination target frame is determined to be legal by the first determination and the determination target frame is determined to be illegal by the second determination, the processor may report at least information of a command included in the determination target frame and information of a transmission source device of the determination target frame.

According to this aspect, since information on an ECU that has a possibility of being taken over is notified to the external device in addition to a command for which illegality has been detected, appropriate data processing can be supported on the external device side.

[Item 6]

When a determination target frame is determined to be legal by the first determination and the determination target frame is determined to be illegal by the second determination, and when a reception frequency of a frame having the same ID as the determination target frame exceeds a predetermined value, the processor may report at least information of a command included in the determination target frame.

According to this aspect, it is possible to detect injection of an illegal frame from outside and report appropriate contents.

[Item 7]

When a determination target frame is determined to be illegal by the first determination and the determination target frame is determined to be illegal by the second determination, the processor may report at least information of a command included in the determination target frame.

According to this aspect, since illegality of the determination target frame can be detected correctly in the monitoring device, it is possible to suppress increase of a communication traffic by restraining notification contents to the information of a command in which the illegality has been detected

[Item 8]

When a determination target frame is determined to be illegal by the first determination and the determination target frame is determined to be legal by the second determination, the processor may report at least information of a command included in the determination target frame and information of another command related to the command.

According to this aspect, when there is a possibility that a rule is incomplete, it is possible to support improvement of the rule.

[Item 9]

When a frame that is excluded from the first determination is determined to be illegal by the second determination, and when a reception frequency of a frame having the same ID as the frame matches with a predetermined value, the processor may report at least information of a command included in the frame and information on a transmission source device of the frame with a lower priority than another communication.

According to this aspect, it is possible to detect takeover of electronic equipment having no message authentication key and report appropriate contents with an appropriate priority.

[Item 10]

When a frame that is excluded from the first determination is determined to be illegal by the second determination, and when a reception frequency of a frame having the same ID as the frame exceeds a predetermined value, the processor may report at least information of a command included in the frame with a lower priority than another communication.

According to this aspect, it is possible to detect that an illegal frame having no message authentication key has been injected from outside and report appropriate contents with an appropriate priority.

[Item 11]

The processor may execute a plurality of intermediate determinations, based on a state of a determination target frame and a plurality of predetermined rules, and derive a result of the second determination according to results of the plurality of intermediate determinations. In addition, the processor, when there is a result indicating non-conformity with the rule in a plurality of intermediate determination results, may notify an external device of the plurality of intermediate determination results and change the priority of notification depending on the number of results indicating non-conformity with the rule.

According to this monitoring device, it is possible to enhance a strength of security by behavior verification.

[Item 12]

The monitoring method executed by a computer includes receiving a frame from a communication network. In addition, the monitoring method includes performing a first determination that determines whether the frame is illegal based on a result of message authentication for the frame and a second determination that determines whether the frame is illegal based on a state of the frame and a predetermined rule. Further, the monitoring method includes changing at least one of the content to be notified to the external device and the priority of notification according to a combination of a result of the first determination and a result of the second determination.

According to this monitoring device, it is possible to execute notification to the external device with appropriate contents or at an appropriate timing corresponding to a security state of the own device.

[Item 13]

The computer program causes a computer to execute receiving a frame from a communication network. In addition, the computer program causes a computer to execute a first determination that determines whether the frame is illegal based on a result of message authentication for the frame and a second determination that determines whether the frame is illegal based on a state of the frame and a predetermined rule. Further, the computer program causes a computer to execute changing at least one of the content to be notified to the external device and the priority of notification according to a combination of a result of the first determination and a result of the second determination.

According to this computer program, it is possible to execute notification to the external device with appropriate contents or at an appropriate timing corresponding to a security state of the own device.

Any desired combinations of the above described exemplary embodiment and the above described modified examples are also useful as other exemplary embodiments of the present invention. Any new exemplary embodiments formed by such combinations include benefits of the exemplary embodiments and the modified examples combined into the new exemplary embodiments. It will be understood by those skilled in the art that functions that should be carried out by constituent elements described in the appended claims can be achieved by each of or through cooperation of the constituent elements illustrated in the exemplary embodiment and the modified examples.

The present invention is useful for a monitoring device, a monitoring method, a computer program, and the like.

What is claimed is:

1. A monitoring device comprising:
a receiver that receives a frame from a communication network; and
a processor that when executing instructions:
performs a first determination that determines whether the frame is illegal or legal based on a result of message authentication for the frame, the first determination determines that the frame is legal when the message authentication succeeds, and determines that the frame is illegal when the message authentication fails,
performs a second determination that determines whether the frame is illegal or legal based on compliance with at least a predetermined behavior rule for the frame,
delivers, when the first determination and the second determination both indicate that the frame is legal, the frame to a transmitter and causes the transmitter to transmit the frame to the communication network, and
executes, when a combination of a result of the first determination and a result of the second determination indicates that the frame is illegal, at least one of
processing a command countermeasure for the frame,
processing a countermeasure with respect to a transmission source device that transmitted the frame,
changing of notification contents to be transmitted to an external device, and
changing of a priority of notification to be transmitted to the external device
wherein the second determination is different from a determination based on the result of message authentication, and wherein the first determination is independent of the second determination.

2. The monitoring device according to claim 1, wherein when a determination target frame is determined to be legal by the first determination and the determination target frame is determined to be illegal by the second determination, or when the determination target frame is determined to be illegal by the first determination and the determination target frame is determined to be illegal by the second determination, the processor executes processing of discarding or invalidating the determination target frame.

3. The monitoring device according to claim 1, wherein when a determination target frame is determined to be legal by the first determination and the determination target frame is determined to be illegal by the second determination, or when the determination target frame is determined to be illegal by the first determination and the determination target frame is determined to be illegal by the second determination,
the processor detects a target device of an illegality countermeasure from among a plurality of transmission source devices, based on presence or absence of an illegality in a plurality of frames transmitted from the plurality of transmission source devices, and executes at least one of
(1) processing of discarding or invalidating a frame to be transmitted from the target device,
(2) processing of updating a computer program in the target device,
(3) processing of updating a key of the message authentication in a transmission source device other than the target device, and
(4) processing of discarding or invalidating a frame received from a bus of the communication network connected with the target device.

4. The monitoring device according to claim 1, wherein when a determination target frame is determined to be legal by the first determination and the determination target frame is determined to be illegal by the second determination, and when the determination target frame is received from a bus in which a frame transmitted from other than a predetermined transmission source device flows, the processor executes processing of updating a key of the message authentication in the predetermined transmission source device.

5. The monitoring device according to claim 1, wherein when a determination target frame is determined to be illegal by the first determination and the determination target frame is determined to be legal by the second determination, the processor stores at least log data related to the determination target frame.

6. The monitoring device according to claim 1, wherein the processor classifies a determination target frame into any of a legal frame, an illegal frame, and a gray frame in accordance with a degree of deviation between a state of the determination target frame and the rule, and when the determination target frame is classified into the gray frame, the processor stores at least log data related to the determination target frame.

7. The monitoring device according to claim 1, wherein, the monitoring device is an electronic control unit mounted in a vehicle, and
the processor switches an automatic driving mode of the vehicle to a fail-safe mode, when a frame transmitted via a predetermined gateway device in an in-vehicle network is determined to be illegal by the second determination.

8. The monitoring device according to claim 1, wherein when a determination target frame is determined to be legal by the first determination and the determination target frame is determined to be illegal by the second determination, the processor sets a priority of notification of information related to the determination target frame to a higher priority than another communication.

9. The monitoring device according to claim 1, wherein when a determination target frame is determined to be illegal by the first determination and the determination target frame is determined to be illegal by the second determination, the processor sets a priority of notification of information related to the determination target frame to a lower priority than another communication.

10. The monitoring device according to claim 1, wherein when a determination target frame is determined to be illegal by the first determination and the determination target frame is determined to be legal by the second determination, the processor sets a priority of notification of information related to the determination target frame to a lower priority than when a determination target frame is determined to be legal by the first determination and the determination target frame is determined to be illegal by the second determination, and to a higher priority than when a determination target frame is determined to be illegal by the first determination and the determination target frame is determined to be illegal by the second determination.

11. The monitoring device according to claim 1, wherein when a determination target frame is determined to be legal by the first determination and the determination target frame is determined to be illegal by the second determination, the processor reports at least information of a command included in the determination target frame and information of a transmission source device of the determination target frame.

12. The monitoring device according to claim 1, wherein when a determination target frame is determined to be legal by the first determination and the determination target frame is determined to be illegal by the second determination, and when a reception frequency of a frame having a same identification (ID) as the determination target frame exceeds a predetermined value, the processor reports at least information of a command included in the determination target frame.

13. The monitoring device according to claim 1, wherein when a determination target frame is determined to be illegal by the first determination and the determination target frame is determined to be illegal by the second determination, the processor reports at least information of a command included in the determination target frame.

14. The monitoring device according to claim 1, wherein when a determination target frame is determined to be illegal by the first determination and the determination target frame is determined to be legal by the second determination, the processor reports at least information of a command included in the determination target frame and information of another command related to the command.

15. The monitoring device according to claim 1, wherein when a frame that is excluded from the first determination is determined to be illegal by the second determination, and when a reception frequency of a frame having a same identification (ID) as the frame matches with a predetermined value, the processor reports at least information of a command included in the frame and information of a transmission source device of the frame with a lower priority than another communication.

16. The monitoring device according to claim 1, wherein when a frame that is excluded from the first determination is determined to be illegal by the second determination, and when a reception frequency of a frame having a same ID as the frame exceeds a predetermined value, the processor reports at least information of a command included in the frame with a lower priority than another communication.

17. The monitoring device according to claim 1, wherein the processor
executes, based on a state of a determination target frame and a plurality of predetermined behavioral rules, a plurality of intermediate determinations, and derives a result of the second determination based on the plurality of intermediate determinations, and
when there exists a result indicating non-conformity with the rules among the results of the plurality of intermediate determinations, the processor notifies an external device of the results of the plurality of intermediate determinations and changes a priority of notification depending on a number of results indicating non-conformity with the rules.

18. A monitoring method executed by a computer, the monitoring method comprising:
receiving a frame from a communication network;
performing a first determination that determines whether the frame is illegal or legal based on a result of message authentication for the frame, the first determination determines that the frame is legal when the message authentication succeeds, and determines that the frame is illegal when the message authentication fails;
performing a second determination that determines whether the frame is illegal or legal based on compliance with at least a predetermined behavior rule for the frame;
delivering, when the first determination and the second determination both indicate that the frame is legal, the frame to a transmitter and causing the transmitter to transmit the frame to the communication network; and
executing, when a combination of a result of the first determination and a result of the second determination indicates that the frame is illegal, at least one of
processing a command countermeasure for the frame,
processing a countermeasure with respect to a transmission source device that transmitted the frame,
changing of notification contents to be transmitted to an external device, and
changing of a priority of notification to be transmitted to the external device,
wherein the second determination is different from a determination based on the result of message authentication, and
wherein the first determination is independent of the second determination.

19. A non-transitory recording medium storing a computer program for causing a computer to execute:
receiving a frame from a communication network;
performing a first determination that determines whether the frame is illegal or legal based on a result of message authentication for the frame, the first determination determines that the frame is legal when the message authentication succeeds, and determines that the frame is illegal when the message authentication fails;
performing a second determination that determines whether the frame is illegal or legal based on compliance with at least a predetermined behavior rule for the frame;
delivering, when the first determination and the second determination both indicate that the frame is legal, the frame to a transmitter and causing the transmitter to transmit the frame to the communication network; and
executing, when a combination of a result of the first determination and a result of the second determination indicates that the frame is illegal, at least one of
processing a command countermeasure for the frame,
processing a countermeasure with respect to a transmission source device that transmitted the frame,
changing of notification contents to be transmitted to an external device, and
changing of a priority of notification to be transmitted to the external device,
wherein the second determination is different from a determination based on the result of message authentication, and wherein the first determination is independent of the second determination.

\* \* \* \* \*